United States Patent [19]

Asamura et al.

[11] Patent Number: 5,543,845
[45] Date of Patent: Aug. 6, 1996

[54] HIGH EFFICIENCY ENCODING APPARATUS

[75] Inventors: Yoshinori Asamura; Yoshiko Hatano; Ken Onishi; Takashi Shiroshita, all of Nagaokakyo, Japan

[73] Assignee: Mitsubishi Denki Kabushiki Kaisha, Tokyo, Japan

[21] Appl. No.: 430,280

[22] Filed: Apr. 28, 1995

Related U.S. Application Data

[60] Continuation of Ser. No. 217,961, Mar. 25, 1994, abandoned, which is a division of Ser. No. 846,791, Mar. 5, 1992.

[30] Foreign Application Priority Data

| Mar. 7, 1991 | [JP] | Japan | 3-041512 |
| Mar. 8, 1991 | [JP] | Japan | 3-043496 |
| Mar. 13, 1991 | [JP] | Japan | 3-048015 |
| Jun. 19, 1991 | [JP] | Japan | 3-147068 |

[51] Int. Cl.⁶ .................................. H04N 7/30
[52] U.S. Cl. ................ 348/407; 348/398; 348/438
[58] Field of Search ................ 348/403, 407, 348/408, 398, 431, 438; H04N 7/133

[56] References Cited

U.S. PATENT DOCUMENTS

| 4,683,494 | 6/1987 | Furukawa et al. . | |
| 4,887,156 | 12/1989 | Ohki . | |
| 4,918,524 | 4/1990 | Ansari et al. . | |
| 4,933,763 | 6/1990 | Chantelou . | |
| 4,969,040 | 11/1990 | Gharavi . | |
| 4,987,480 | 1/1991 | Lippman et al. | 348/398 |
| 5,006,931 | 4/1991 | Shirota | 348/408 |
| 5,048,111 | 9/1991 | Jones et al. | 348/398 |
| 5,097,331 | 3/1992 | Chen et al. | 348/398 |
| 5,134,464 | 7/1992 | Basile et al. | 348/438 |
| 5,136,374 | 8/1992 | Jayant . | |
| 5,184,219 | 2/1993 | Cho | 348/431 |
| 5,202,760 | 4/1993 | Tourtier et al. | 348/398 |
| 5,214,502 | 5/1993 | Stone et al. | 348/398 |
| 5,220,422 | 6/1993 | Oh | 348/398 |
| 5,235,420 | 8/1993 | Gharavi . | |
| 5,235,421 | 8/1993 | Yang | 348/398 |
| 5,337,085 | 8/1994 | Lee et al. | 348/398 |
| 5,404,167 | 4/1995 | Bist et al. | 348/398 |
| 5,412,429 | 5/1995 | Glover | 348/398 |
| 5,412,741 | 5/1995 | Shapiro | 348/398 |

FOREIGN PATENT DOCUMENTS

| 0412713 | 2/1991 | European Pat. Off. . |
| 63-38385 | of 1988 | Japan . |

OTHER PUBLICATIONS

"An Experimental Digital VCR with 40mm Drum, Single Actuator and DCT–Based Bit–Rate Reduction" IEEE Transactions on Consumer Electronics, vol. 34, No. 3, (Aug. 1988).
Patent Abstracts of Japan, vo. 14, No. 252, May 30, 1990.
1988 International Conference on Acoustics, Speech, and Signal Processing, Apr. 11–14, 1988, vol. II, pp. 1100–1103.

*Primary Examiner*—Tommy P. Chin
*Assistant Examiner*—Richard Lee

[57] ABSTRACT

An encoding apparatus which structures a band-divided digital image signal into three-dimensional blocks each having a plurality of pixels, discriminates each three-dimensional block between a moving image block and a static image block, and, in the case of a static image block, encodes only the three-dimensional blocks in the lower frequency bands while dropping the three-dimensional blocks in the higher frequency bands. However, of moving image blocks, blocks having a large pixel variance value are encoded as effective image blocks. Also, different size weightings are performed to transform coefficients depending on whether the block is discriminated as a moving image block or a static image block. Furthermore, shuffling is performed on a group of moving image blocks and a group of static image blocks independently of each other, and the transform coefficients for the static image blocks are quantized after quantizing all transform coefficients for the moving image blocks.

15 Claims, 30 Drawing Sheets

ONE BLOCK AFTER
SUBSAMPLING

Fig. 24(a) LL BAND
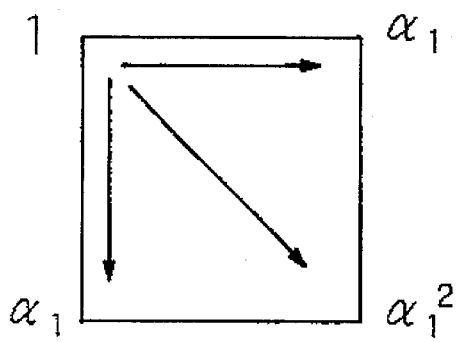
Fig. 24(b) HL BAND
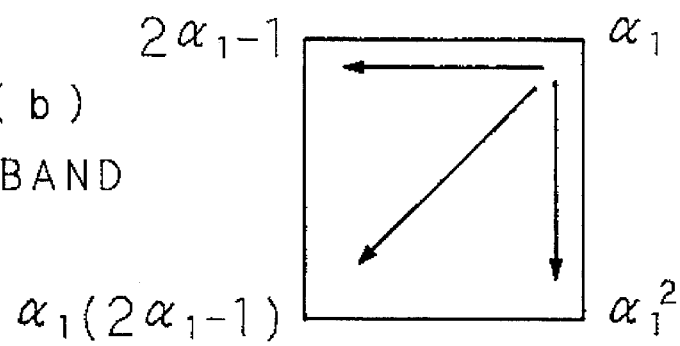
Fig. 24(c) LH BAND
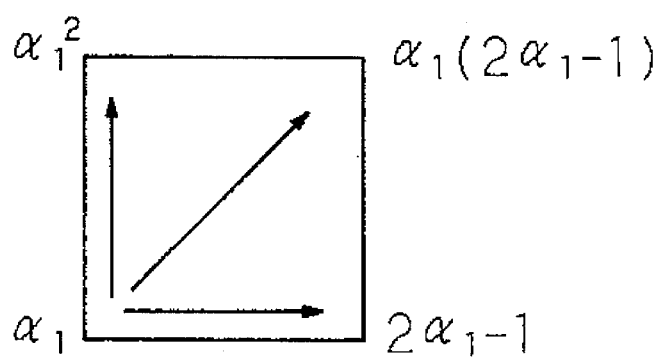
Fig. 24(d) HH BAND
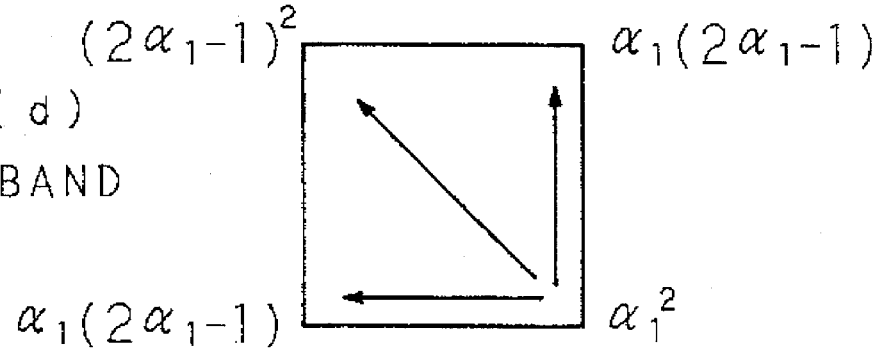

| TRACK No. | BLOCK NUMBER | MOVING IMAGE AREA | | | | | | | | STATIC IMAGE AREA | | | | | | | | | | | | |
|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 |
| 1 | 21 | | | | | | | | | | | | | | | | | | | | | |
| 2 | 21 | | | | | | | | | | | | | | | | | | | | | |
| 3 | 21 | | | | | | | | | | | | | | | | | | | | | |
| 4 | 20 | | | | | | | | | | | | | | | | | | | | | |
| 5 | 21 | | | | | | | | | | | | | | | | | | | | | |
| 6 | 20 | | | | | | | | | | | | | | | | | | | | | |
| 7 | 21 | | | | | | | | | | | | | | | | | | | | | |
| 8 | 20 | | | | | | | | | | | | | | | | | | | | | |
| 9 | 21 | | | | | | | | | | | | | | | | | | | | | |
| 10 | 21 | | | | | | | | | | | | | | | | | | | | | |
| 11 | 21 | | | | | | | | | | | | | | | | | | | | | |
| 12 | 20 | | | | | | | | | | | | | | | | | | | | | |
| 13 | 21 | | | | | | | | | | | | | | | | | | | | | |
| 14 | 20 | | | | | | | | | | | | | | | | | | | | | |
| 15 | 21 | | | | | | | | | | | | | | | | | | | | | |
| 16 | 20 | | | | | | | | | | | | | | | | | | | | | |

MOVING IMAGE

STATIC IMAGE

5,543,845

HIGH EFFICIENCY ENCODING APPARATUS

This application is a continuation of application Ser. No. 08/217,961 filed on Mar. 25, 1994, now abandoned, which is a divisional of application Ser. No. 07/846,791 filed on Mar. 5, 1992 pending.

BACKGROUND OF THE INVENTION

1. Field of the Invention

The present invention relates to an encoding apparatus used in a digital video cassette recorder for example, which records digital image signals, wherein the encoding apparatus is used for compressing the digital image signals.

2. Description of Related Art

If digital image signals obtained by digitizing analog image signals are directly recorded on tape or other recording medium, the data amount will be so great that it usually exceeds the data capacity of the recording medium. Therefore, when recording digital image signals on tape or the like, it is necessary to compress the image signals so that the data amount will not exceed the maximum recordable limit. To achieve this, it has been known to compress image signals using a high-efficiency encoding apparatus.

One known method for compressing digital image signals, i.e., for reducing the encoding rate thereof, is a subsampling method, such as disclosed in Japanese Patent Application Laid-Open No. 63-38385, in which sampled signals are dropped at predetermined intervals. FIGS. 1 and 2 are block diagrams respectively illustrating the configurations of the transmitter side (recording side) and receiver side (reproducing side) of a high-efficiency encoding apparatus employing such a method for encoding color video signals.

Referring first to FIG. 1, we will describe the configuration of the transmitter side. A color video signal, compatible with the NTSC system, for example, is input at an input terminal 31. The input color video signal is fed to an A/D converter 32 which outputs a digital color video signal with each sample quantized into an 8-bit code at a sampling frequency of, for example, 4 fsc (fsc: color sub-carrier frequency). The digital color video signal is fed to a subsampling circuit 33 whose output signal is supplied to a blocking circuit 34. Since no band-limiting prefilters are provided at a stage preceding the subsampling circuit 33, the high-frequency components of the input color video signal will not be lost.

In the subsampling circuit 33, the digital color video signal is sampled at a sampling frequency of 2 fsc. The blocking circuit 34 divides the supplied digital color video signal into two-dimensional blocks each comprising successive signals and serving as a unit of encoding. In this prior art example, a picture of one field is divided into blocks of 32 pixels (8 pixels×4 lines). FIG. 3 shows one block thus obtained, in which the solid lines represent lines in an odd-numbered field and the dotted lines correspond to lines in an even-numbered field. Alternatively, four two-dimensional regions respectively belonging to four frames may be organized into a three-dimensional block, and such a three-dimensional block may be used as one block. The subsampling circuit 33 provided at the stage preceding the blocking circuit 34 decimates selected pixels within the block, as shown in FIG. 4, thereby reducing the number of pixels within one block to 16. In FIG. 4, the subsampled pixels are designated by ○, and the decimated pixels designated by x.

The output signal of the blocking circuit 84 is delivered to a dynamic range (DR) detection circuit 35 as well as to a delay circuit 36. The DR detection circuit 35 detects a dynamic range DR and minimum value MIN of each block. The delay circuit 36 outputs pixel data PD to a subtracter 37 which produces pixel data PDI by removing the minimum value MIN.

The subsampled pixel data PDI, after removal of the minimum value through the subtracter 37, and the dynamic range DR are inputted to a quantizing circuit 38. The quantizing circuit 38 quantizes the pixel data PDI in accordance with the dynamic range DR and produces a code signal DT that represents one-pixel data converted into a 4-bit code.

The code signal DT outputted from the quantizing circuit 38 is transferred to a framing circuit 39. The dynamic range DR (8 bits) and the minimum value MIN (8 bits) are also input, as appended codes for each block, to the framing circuit 39. The framing circuit 39 performs error-correction coding on the code signal DT and the appended codes and appends a synchronizing signal. Transmission data is obtained at an output terminal 40 of the framing circuit 39, and the transmission data is transferred onto a transmission channel such as a digital line. In the case of a digital video cassette recorder, the output signal is transferred to a rotary head via a recording amplifier, rotary transformer, etc.

Referring to FIG. 2, we will now describe the configuration of the receiver side. The received data at an input terminal 41 is input to a frame disassembling circuit 42 which disassembles the received data into the code signal DT and the appended codes DR and MIN and performs error correction. The code signal DT and the dynamic range DR are then transferred to a decoding circuit 43.

The decoding circuit 43 carries out a decoding process which is the reverse of the process performed by the quantizing circuit 38 in the transmitter side. More specifically, the data with the 8-bit minimum value removed is decoded to a representative level, and the decoded data and the 8-bit minimum value MIN are added together by an adder 44 to reproduce the original pixel data. The output data of the adder 44 is fed to a block disassembling circuit 45. The block disassembling circuit 45 carries out a disassembling process which is the reverse of the process performed by the blocking circuit 34 in the transmitter side, rearranging the block-sequenced decoded data into the same order in which the television signal is scanned. The output signal of the block disassembling circuit 45 is transferred to an interpolation circuit 46. In the interpolation circuit 46, the approximation of the decimated pixel data is constructed by using neighboring subsampled data. The interpolation circuit 46 outputs a digital color video signal with a sampling frequency of 4 fsc to a D/A converter 47, and an analog color video signal is obtained at an output terminal 48 of the D/A converter 47. When no prefilters are provided at the transmitter side, aliasing distortion may occur, for example, at points where the brightness level abruptly changes; therefore, a circuit for eliminating this distortion may be connected to the output side of the interpolation circuit 46.

FIG. 5 is a block diagram illustrating the configuration of a conventional high-efficiency encoding apparatus described, for example, in "An Experimental Digital VCR with 40 mm Drum, Single Actuator and DCT-Based Bit-Rate Reduction", IEEE Transactions on Consumer Electronics, Vol. 34, No. 3 (August 1988). In the figure, the reference numeral 71 designates a blocking circuit for dividing an input digital image signal into a plurality of blocks. The blocking circuit 71 supplies each block of the image signal to a DCT circuit 72. The DCT circuit 72 performs a discrete cosine transform (DCT) on each block of the image signal supplied from the blocking circuit 71 and outputs transform coefficients to a weighting circuit 73. The weighting circuit 73 assigns a weighting to each transform coefficient and supplies the weighted transform coefficient to an adaptive quantizing circuit 74. The adaptive quantizing circuit 74 contains a plurality of quantization tables with different quantization levels, quantizes the weighted transform coefficient with the optimum quantization level, and outputs the quantized transform coefficient to a variable-length encoding circuit 75. The variable-length encoding circuit 75 encodes the quantized transform coefficient into a variable-length code which is then transferred to a buffer memory 76. The buffer memory 76 stores the variable-length encoded data and outputs the stored data at a fixed output rate. A buffer controller 77 controls the quantization level in the adaptive quantizing circuit 74 so that an overflow does not occur in the buffer memory 76, while selecting the transform coefficients to be encoded by the variable-length encoding circuit 75.

The operation of the above encoding apparatus will now be described in detail. The input digital image signal comprises, for example, a luminance signal and two color-difference signals. These signals are first time-divided and then divided by the blocking circuit 71 into blocks of, for example, 8 pixels×8 lines, which are then transferred to the DCT circuit 72. The DCT circuit 72 performs an 8-pixel discrete cosine transform, in both the horizontal and vertical directions, on each block of the image signal. First, when the image signal is denoted as x(i, j) (i, j=0, 1, ..., 7), a horizontal 8-pixel DCT as expressed by the following equation is performed.

$$f(0, j) = \frac{1}{2\sqrt{2}} \sum_{i=0}^{7} x(i, j)$$

$$f(m, j) = \frac{1}{2} \sum_{i=0}^{7} x(i, j) \cos \frac{(2i+1)m\pi}{16}$$

$$(m = 1, 2, \ldots, 7) \quad (j = 0, 1, \ldots, 7)$$

A vertical 8-pixel DCT as expressed by the following equation is performed on the above transformed image signal f(0, j), f(m, j), and the image signal, expressed as a transform coefficient F(m, n) (m, n=0, 1, ..., 7), is transferred to the weighting circuit 73.

$$F(m, 0) = \frac{1}{2\sqrt{2}} \sum_{j=0}^{7} f(m, j)$$

$$F(m, n) = \frac{1}{2} \sum_{j=0}^{7} f(m, j) \cos \frac{(2j+1)n\pi}{16}$$

$$(n = 1, 2, \ldots, 7) \quad (m = 0, 1, \ldots, 7)$$

Each transform coefficient supplied to the weighting circuit 73 is assigned a weight. More specifically, taking advantage of the property of the human eye which is less sensitive to higher spatial frequencies, as shown in FIG. 6, smaller weightings are assigned to areas containing higher spatial frequency components and larger weightings to areas containing lower spatial frequency components. Here, the weighting factor W (m, n) can be expressed by the following equation.

$$W(m, n) = \frac{7 - (1 - \alpha)m}{7} \times \frac{7 - (1 - \alpha)n}{7}$$

$$(0 < \alpha \leq 1), (m, n = 0, 1, \ldots, 7)$$

The output of the weighting circuit 73 is quantized by the adaptive quantizing circuit 74. Based on the transform coefficient for each block and the quantization parameter supplied from the buffer controller 77, the optimum quantization level is selected for the adaptive quantizing circuit 74, and the weighted transform coefficient is quantized with the thus selected optimum quantization level.

More specifically, a low bit quantization level is selected for image data corresponding to the rising edge of a high contrast, while for imagine data corresponding to details with small amplitudes, a high bit quantization level is selected.

The quantized transform coefficient is encoded by the variable-length encoding circuit 75 into a variable-length code which is then stored in the buffer memory 76. The amount of data stored in the buffer memory 76 is monitored by the buffer controller 77 in order to prevent the buffer memory 76 from overflowing. The buffer controller 77 determines the quantization parameter with reference to the amount of data stored in the buffer memory 76 and controls the quantization level in the adaptive quantizing circuit 74 on the basis of the quantization parameter while selecting the transform coefficients to be encoded by the variable-length encoding circuit 75 with reference to the data amount. That is, the buffer controller 77 performs control in such a manner as to increase the data compression rate when the amount of data stored in the buffer memory 76 is large and reduce the compression rate when the amount of stored data is small, thereby preventing the buffer memory 76 from overflowing. The data stored in the buffer memory 76 is read out at a fixed output rate.

With the above configuration, the prior art encoding apparatus attains a reduction in the encoding rate. When a comparison is made between a moving image and a static image, the human eye is more sensitive to a static image than to a moving image. However, the above prior art encoding apparatus does not consider this property of the human eye and performs encoding and weighting processes without varying the encoding conditions or controlling the weighting factors according to whether the image is a moving image or a static image. This gives rise to a problem from the point of view of image compression efficiency.

Furthermore, an image signal is divided into subbands according to the frequency band, and each of the subbands of the image signal is further divided into blocks; however, when an orthogonal transform is performed on each of the resulting subband blocks, since the individual subbands have different frequency characteristics, it is necessary to select a weighting suitable for each subband.

SUMMARY OF THE INVENTION

An object of the present invention is to provide an encoding apparatus that can reduce the encoding rate while minimizing image degradation and thus can achieve effective data compression, the construction of the encoding apparatus being such that each block is discriminated between a moving image and a static image and encoding is performed, in the case of a moving image, after dropping some blocks that do not have perceptible effects on the image quality at the receiver side.

Another object of the invention is to provide an encoding apparatus that can reduce the encoding rate while minimizing image degradation at the decoding side and thus can achieve effective data compression, the construction of the encoding apparatus being such that each block is discriminated between a moving image and a static image and encoding is performed, in the case of a moving image, only on effective image blocks having substantial effects on the entire image, i.e., having image signal variance values greater than a predetermined value.

A further object of the invention is to provide an encoding apparatus that can achieve effective compression on digital image signals by assigning different weightings between a moving image and a static image and also by selecting a weighting that matches the frequency response of each subband block.

A still further object of the invention is to provide an encoding apparatus which can prevent image degradation resulting from an overflow that may occur when an image abruptly changes and which can reduce block distortion by achieving a balanced distribution of moving image blocks and static image blocks and permitting selection of optimum quantization parameters coordinated throughout the entire picture.

According to one aspect of the invention, there is provided an encoding apparatus which divides a digital image signal into a plurality of frequency bands, organizes each band-divided image signal into three-dimensional blocks, discriminates each block between a moving image and a static image, and, in the case of a moving image, encodes each image signal block after dropping the bands that may not have perceptible effects on the moving image quality, i.e., the subband blocks in the higher frequency bands. At this time, an orthogonal transform is performed on each block to obtain a transform coefficient to be encoded, and using this transform coefficient, each block is discriminated between a moving image and a static image.

According to another aspect of the invention, there is provided an encoding apparatus which divides a digital image signal into three-dimensional blocks, discriminates each image signal block between a moving image and a static image while judging, on the basis of the pixel variance value of the block, whether the block is an effective image block that may substantially affects the entire image quality, and performs encoding, in the case of a moving image, only on the effective image blocks. A subband dividing technique may also be incorporated, whereby, after the digital image signal is divided into a plurality of frequency bands, the frequency bands are further divided into subband blocks.

According to a further aspect of the invention, there is provided an encoding apparatus which divides a digital image signal into a plurality of blocks, performs an orthogonal transform on each block to obtain a transform coefficient, discriminates each block between a moving image and a static image on the basis of the obtained transform coefficient, and assigns different weightings depending on whether the image is a moving image or a static image, i.e., larger weightings for a moving image and smaller weightings for a static image. A subband dividing technique may also be incorporated, whereby, after the digital image signal is divided into a plurality of frequency bands, the frequency bands are further divided into subband blocks. In this case, weights are assigned in each subband block in such a manner as to provide continuity between adjacent subband blocks.

According to a still further aspect of the invention, there is provided an encoding apparatus which discriminates an image signal between a moving image and a static image on a block-by-block basis, performs shuffling on the image blocks after separating moving image blocks and static image blocks so as to maintain a nearly constant ratio between the moving image blocks and the static image blocks in each transmission unit, and performs quantization and encoding first on the moving image blocks and then on the static image blocks.

The above and further objects and features of the invention will more fully be apparent from the following detailed description with accompanying drawings.

BRIEF DESCRIPTION OF THE DRAWINGS

FIGS. 24(a)–(d) is a diagram explaining how weightings are assigned by a weighting circuit according to the third embodiment.

FIG. 28 is a diagram explaining block divisions according to the fourth embodiment.

FIG. 29 is a diagram showing assignment of image blocks to recording tracks according to the fourth embodiment.

DESCRIPTION OF THE PREFERRED EMBODIMENTS

The preferred embodiments of the present invention will now be described in detail with reference to the accompanying drawings.

(Embodiment 1)

Figure 7:
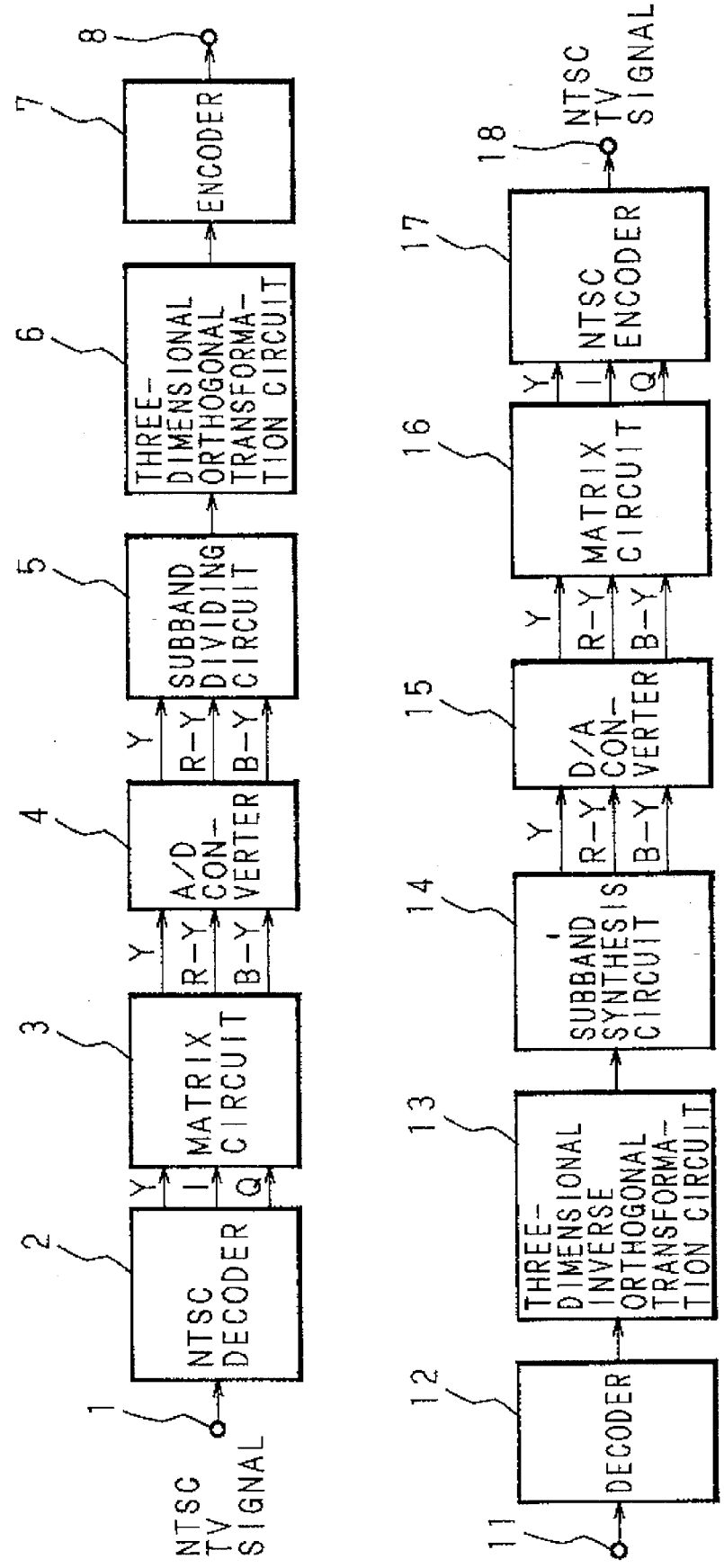
FIG. 7 is a block diagram illustrating the configuration of an encoding apparatus according to a first embodiment of the present invention.

FIG. 7 is a block diagram illustrating the configuration of a high-efficiency encoding apparatus according to a first embodiment of the present invention. In the figure, the reference numeral 1 designates an input terminal at which an NTSC-compatible color television signal is received. An NTSC decoder 2 extracts the luminance signal (Y signal) and the chrominance signal (I and Q signals) from the color television signal. The extracted Y, I, and Q signals are fed to a matrix circuit 3 which transforms these signals into the luminance signal (Y signal) and color-difference signals (R-Y and B-Y signals) and feeds the thus transformed signals to an A/D converter 4. The A/D converter 4 converts the Y, B-Y, and B-Y signals to digital signals and feeds these digital signals to a subband dividing circuit 5. The subband dividing circuit 5 divides each of the Y, R-Y, and B-Y signals into four subbands according to the frequency and further divides each subband into subband blocks, each subband block then being fed to a three-dimensional orthogonal transformation circuit 6. The three-dimensional orthogonal transformation circuit 6 performs a three-dimensional DCT on each subband block to produce a transform coefficient, discriminates each subband block between a moving image subband block and a static image subband block, and supplies the transform coefficient and the discrimination result to an encoder 7. The encoder 7 quantizes and encodes the supplied transform coefficient and outputs the encoded data via an output terminal 8.

In FIG. 7, the reference numerals 11 to 18 designate component elements of a decoding side. The numeral 11 indicates an input terminal at which the above encoded data is supplied. The input terminal 11 is connected to a decoder 12 which reconverts the encoded data to three-dimensional data and feeds the three-dimensional data to a three-dimensional inverse orthogonal transformation circuit 13. The three-dimensional inverse orthogonal transformation circuit 13 performs an inverse DCT on the three-dimensional data. A subband synthesis circuit 14 synthesizes the inverse-transformed three-dimensional data of each band to reconstruct the original field image and feeds the Y, R-Y, and B-Y digital signals to a D/A converter 15. The D/A converter 15 converts these signals to analog signals which are fed to a matrix circuit 16. The matrix circuit transforms the Y, R-Y, and B-Y analog signals back to the Y, I, and Q signals and feeds them to an NTSC encoder 17 which converts the Y, I, and Q signals to the NTSC color television signal for output at an output terminal 18.

Figure 8:
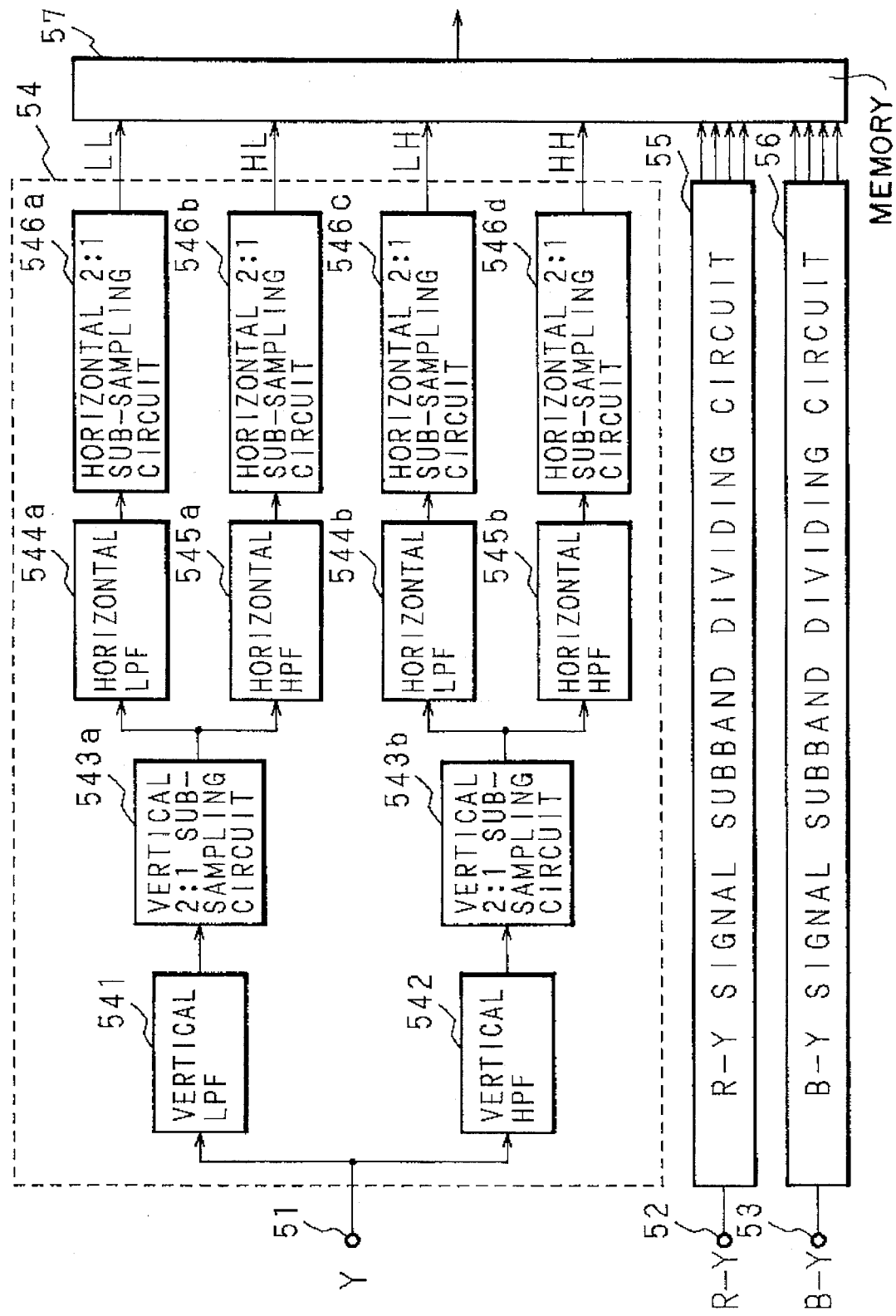
FIG. 8 is a block diagram illustrating the configuration of a subband dividing circuit in the encoding apparatus of the present invention.

FIG. 8 is a block diagram illustrating the inner configuration of the subband dividing circuit 5. In the figure, the reference numerals 51, 52, and 53 indicate input terminals at which the Y, R-Y, and B-Y signals are respectively inputted from the A/D converter 4. The input terminals 51, 52, and 53 are connected to a Y signal subband dividing circuit 54, an R-Y signal subband dividing circuit 55, and a B-Y signal subband dividing circuit 56, respectively. All of these dividing circuits 54, 55, and 58 have the same configuration; FIG. 8 shows the configuration only of the Y signal subband dividing circuit 54. The Y signal subband dividing circuit 54 comprises: a vertical low-pass filter (vertical LPF) 541; a vertical high-pass filter (vertical HPF) 542; vertical 2:1 subsampling circuits 543a, 543b which respectively sample the outputs of the vertical LPF 541 and the vertical HPF 542 in such a manner as to halve the number of pixels in the vertical direction; horizontal low-pass filters (horizontal LPFs) 544a, 544b; horizontal high-pass filters (horizontal HPFs) 545a, 545b; and horizontal 2:1 subsampling circuits 548a, 548b, 548c, and 546d which respectively sample the outputs of the horizontal LPF 544a, horizontal HPF 545a, horizontal LPF 544b, and horizontal HPF 545b in such a manner as to halve the number of pixels in the horizontal direction. The output data from the dividing circuits 54, 55, and 56 is stored in a memory 57.

Figure 9:
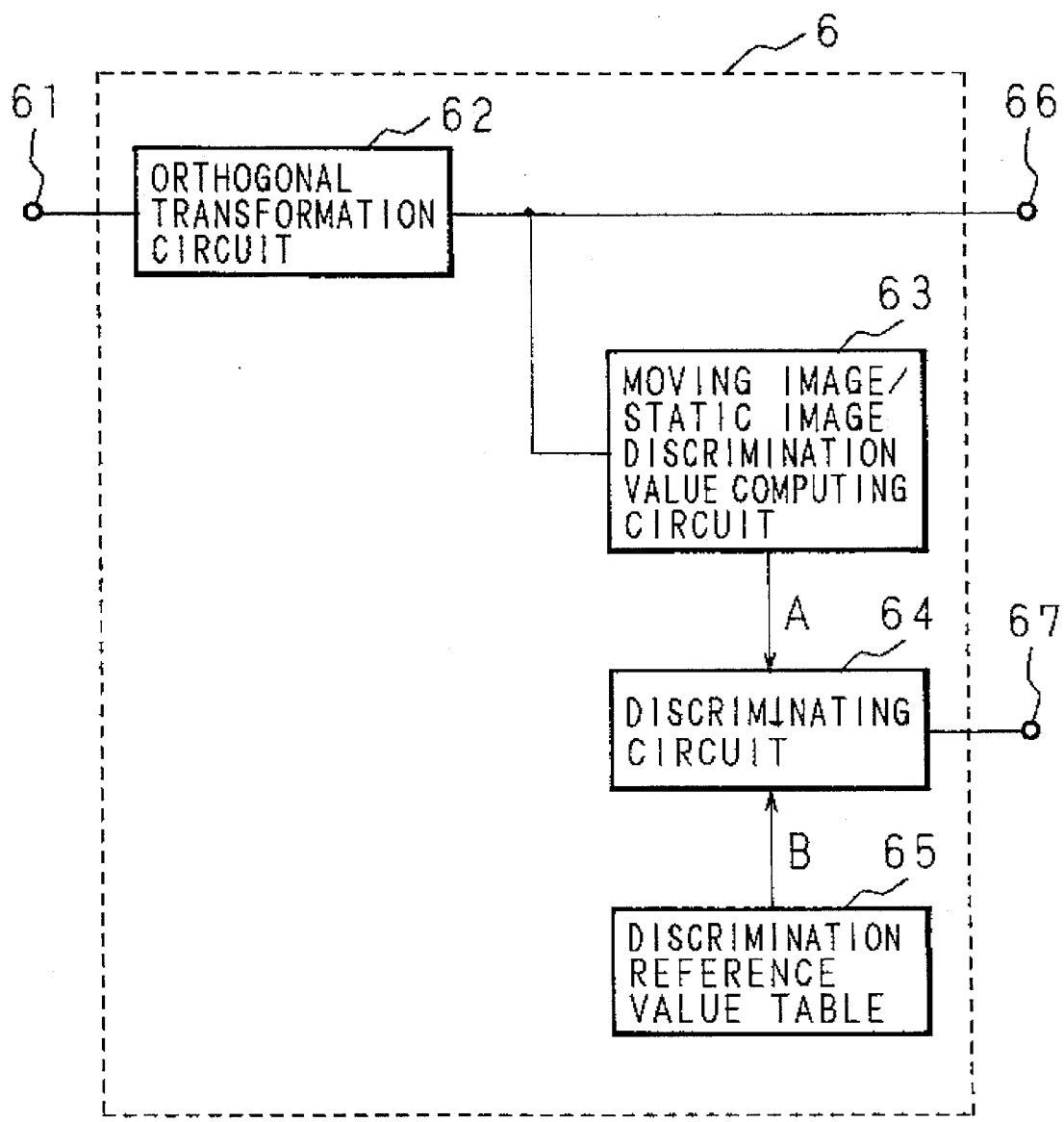
FIG. 9 is a block diagram illustrating the configuration of a three-dimensional orthogonal transformation circuit according to the first embodiment.

FIG. 9 is a block diagram illustrating the configuration of the three-dimensional orthogonal transformation circuit 6. The three-dimensional orthogonal transformation circuit 6 comprises: an orthogonal transformation circuit 62 which performs a three-dimensional DCT on each subband block supplied from the subband dividing circuit 5 via an input terminal 61 and produces a transform coefficient; a moving image/static image discrimination value computing circuit 63 which, using the supplied transform coefficient, computes a discrimination value by which to discriminate each subband block between a moving image one and a static image one; a discrimination reference value table 65 which contains a discrimination reference value based on which to discriminate each subband block between a moving image one and a static image one; and a discriminating circuit 64 for discriminating each subband block between a moving image one and a static image one by comparing the discrimination value supplied from the moving image/static image discrimination value computing circuit 63 with the discrimination reference value supplied from the discrimination reference value table 65. The transform coefficient is entered via an output terminal 66 to the encoder 7, while the discrimination result is entered to the encoder 7 via an output terminal 67.

Figure 10:
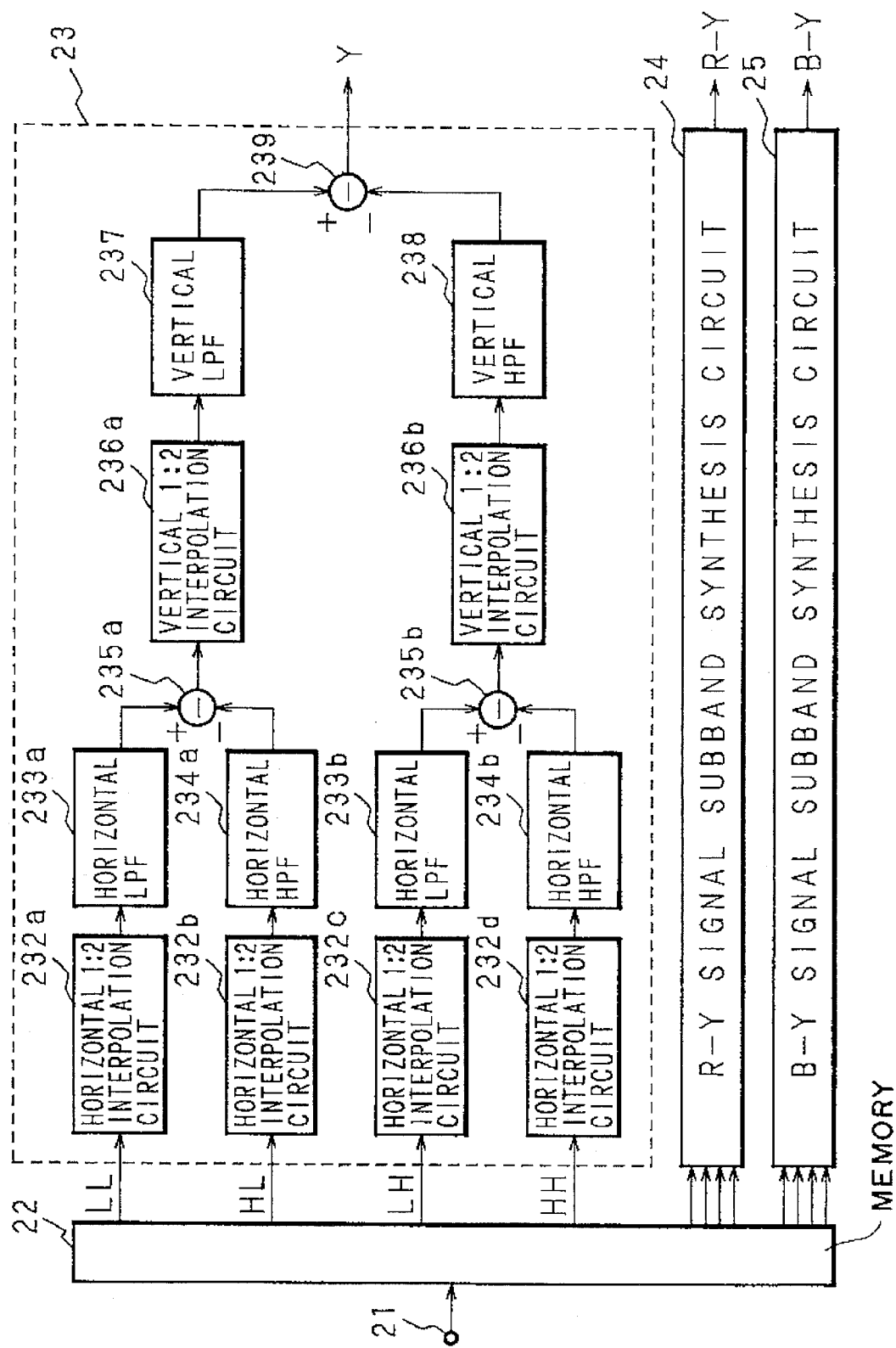
FIG. 10 is a block diagram illustrating the configuration of a subband synthesis circuit in the encoding apparatus of the present invention.

FIG. 10 is a block diagram illustrating the configuration of the subband synthesis circuit 14. In the figure, the reference numeral 22 designates a memory which stores the three-dimensional data supplied from the three-dimensional inverse orthogonal transformation circuit 13 via an input terminal 21. Connected to the memory 22 are a Y signal subband synthesis circuit 23, an R-Y signal subband synthesis circuit 24, and a B-Y signal subband synthesis circuit 25. All of these synthesis circuits 23, 24, and 25 have the same configuration; FIG. 10 shows the configuration only of the Y signal subband synthesis circuit 23. The Y signal subband synthesis circuit 23 comprises: horizontal 1:2 interpolation circuits 232a, 232b, 232c, and 232d which double the number of pixels in the horizontal direction by interpolating 0s; horizontal LPFs 233a and 233b; horizontal HPFs 234a and 234b; subtracters 235a and 235b; vertical 1:2 interpolation circuits 236a and 236b which double the number of pixels in the vertical direction by interpolating 0s; a vertical LPF 237; a vertical HPF 238; and a subtracter 239. The synthesis circuits 23, 24, and 25 respectively supply the Y signal, R-Y signal, and B-Y signal to the D/A converter 15.

The operation of the above configured encoding apparatus will now be described.

Figure 11:
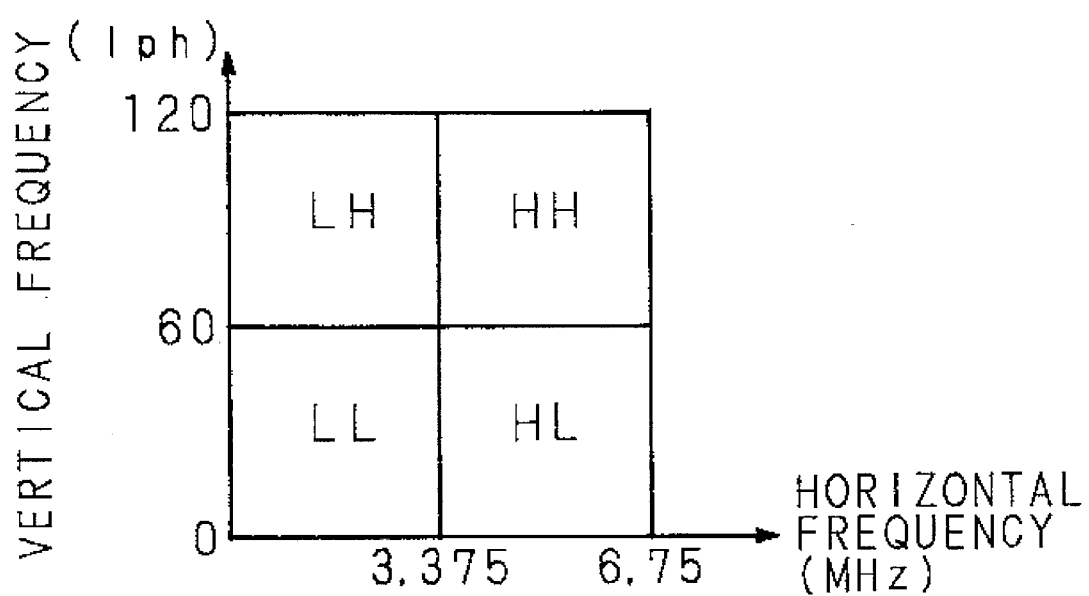
FIG. 11 is a diagram illustrating the division of a Y signal into subbands according to the encoding apparatus of the present invention.
Figure 12:
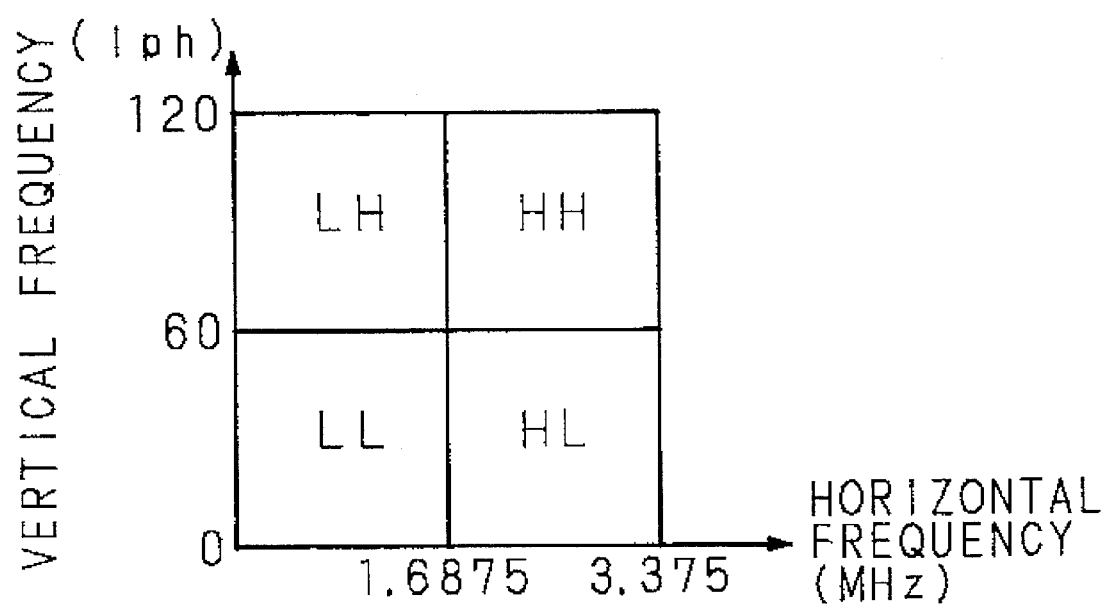
FIG. 12 is a diagram illustrating the division of an R-Y signal and a B-Y signal into subbands according to the encoding apparatus of the present invention.

Generally, the luminance signal and the chrominance signal are separately treated when compressing an image signal. Therefore, the NTSC color television signal supplied at the input terminal 1 is split by the NTSC decoder 2 into the Y signal and the I and Q signals which are then transformed by the matrix circuit 3 into the Y signal and the R-Y and B-Y signals, respectively. These signals are further converted to digital signals by the A/D converter 4. The sampling frequency is 13.5 MHz for the Y signal and 6.75 MHz for the R-Y and B-Y signals. Therefore, for the NTSC color television signal the number of effective samples is, for example, 704 for the Y signal and 352 for each of the R-Y and B-Y signals, a total of 262.5 horizontal lines constituting one field. Of the 262.5 lines, 240 lines, for example, are outputted as effective lines to form one field. In the subband dividing circuit 5, each of the Y signal, R-Y signal, and B-Y signal is divided into a plurality of frequency bands per field. For example, the Y signal is divided into four frequency bands LL, HL, LH, and HH as shown in FIG. 11, and the R-Y and B-Y signals are each divided into four frequency bands LL, HL, LH, and HH as shown in FIG. 12.

Figure 13:
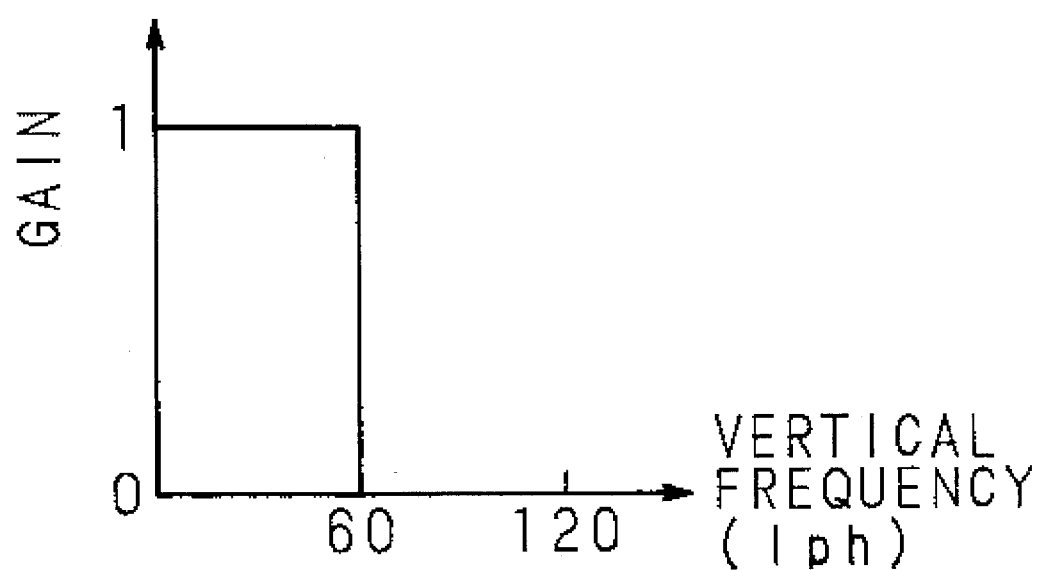
FIG. 13 is a diagram illustrating the frequency response of a vertical LPF in the encoding apparatus of the present invention.
Figure 15:
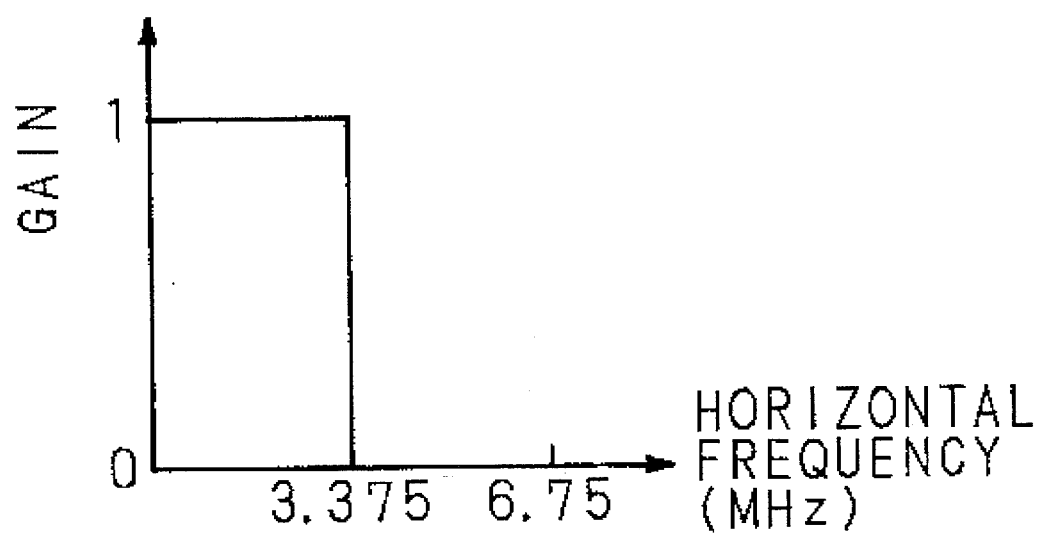
FIG. 15 is a diagram illustrating the frequency response of a horizontal LPF in the encoding apparatus of the present invention.
Figure 16:
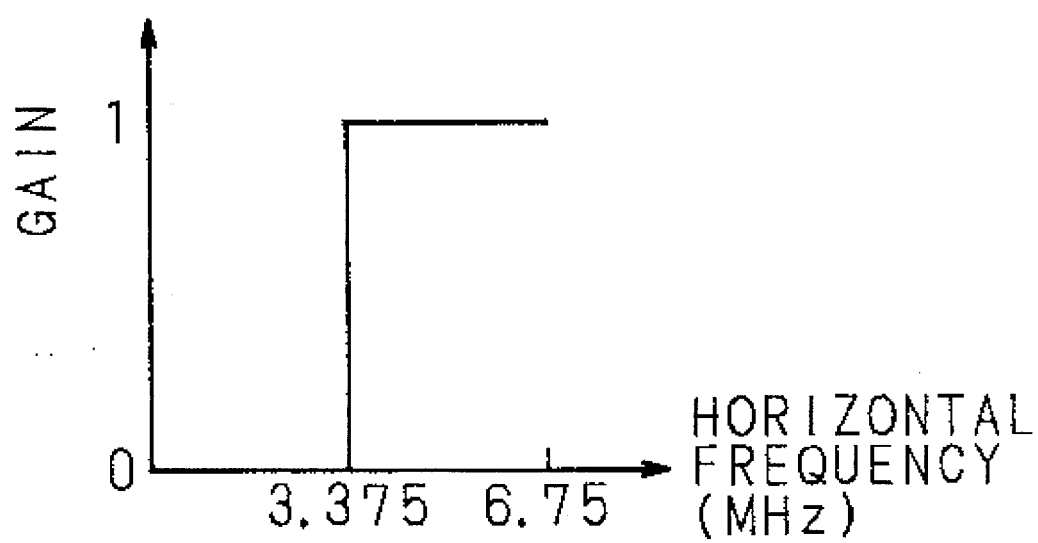
FIG. 16 is a diagram illustrating the frequency response of a horizontal HPF in the encoding apparatus of the present invention.

The operation of the subband dividing circuit 5 will now be described with reference to FIG. 8. The Y signal supplied via the input terminal 51 is divided into four frequency bands by the Y signal subband dividing circuit 54. The slipped Y signal is band-limited by the vertical LPF 541 having the frequency response shown in FIG. 13 and then, the number of pixels in the vertical direction is reduced to ½ by the vertical 2:1 subsampling circuit 543a. The output of the vertical 2:1 subsampling circuit 543a. The passed through the horizontal LPF 544a having the frequency response shown in FIG. 15, and then, the number of pixels in the horizontal direction is reduced to ½ by the horizontal 2:1 subsampling circuit 546a. The output of the horizontal 2:1 subsampling circuit 546a is the signal representing the band LL in FIG. 11, the number of pixels now being reduced to ¼ compared to the input signal. The thus produced output signal is called the LL band of the Y signal. The output of the vertical 2:1 subsampling circuit 543a is also passed through the horizontal HPF 545a having the frequency response shown in FIG. 16, and then, the number of pixels in the horizontal direction is reduced to ½ by the horizontal 2:1 subsampling circuit 546b. The output of the horizontal 2:1 subsampling circuit 546b is the signal representing the band HL in FIG. 11, with the number of pixels now being reduced to ¼ compared to the input signal. The thus produced output signal is called the HL band of the Y signal.

Figure 14:
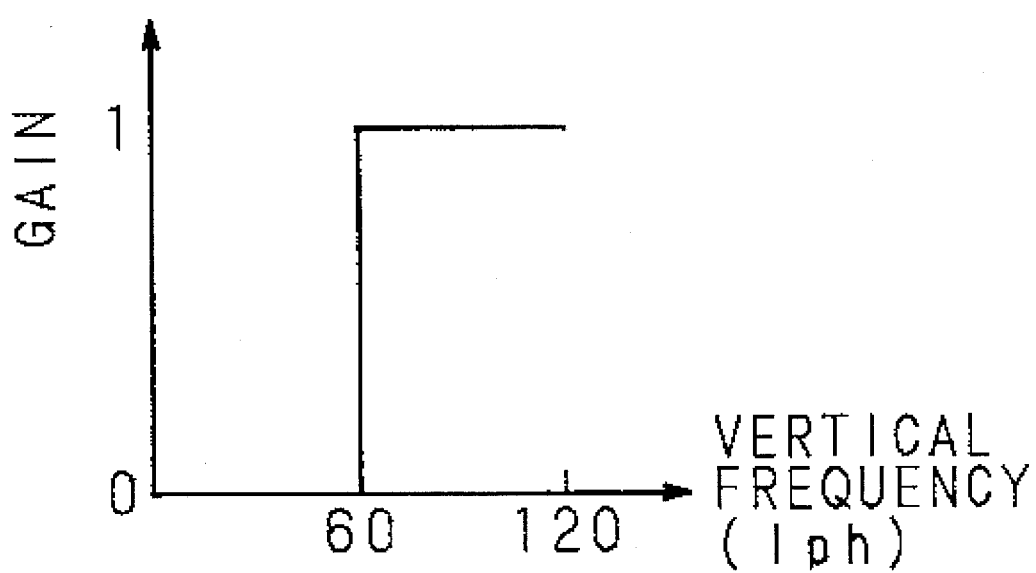
FIG. 14 is a diagram illustrating the frequency response of a vertical HPF in the encoding apparatus of the present invention.

The Y signal supplied via the input terminal 51 is also fed to the vertical HPF 542 having the frequency response shown in FIG. 14. The output of the vertical HPF 542 is fed to the vertical 2:1 subsampling circuit 943b where the number of pixels in the vertical direction is reduced to ½ The output of the vertical 2:1 subsampling circuit is band-limited through the horizontal LPF 544b having the frequency response shown in FIG. 15, after which the number of pixels in the horizontal direction is reduced to ½ by the horizontal 2:1 subsampling circuit 546c. The output of the horizontal 2:1 subsampling circuit 546c is the signal representing the band LH in FIG. 11, with the number of pixels now being reduced to ¼ compared to the input signal. The thus produced output signal is called the LH band of the Y signal. The output of the vertical 2:1 subsampling circuit 543b is also passed through the horizontal HPF 545b having the frequency response shown in FIG. 16, and then, the number of pixels in the horizontal direction is reduced to ½ by the horizontal 2:1 subsampling circuit 546d. The output of the horizontal 2:1 subsampling circuit 546d is the signal representing the band HH in FIG. 11, with the number of pixels now being reduced to ¼ compared to the input signal. The thus produced output signal is called the HH band of the Y signal.

As described, the Y signal subband dividing circuit 54 divides the Y signal into the four bands, LL, HL, LH, and HH, thus outputting the subbands.

On the other hand, the R-Y signal supplied via the input terminal 52 is divided by the R-Y signal subband dividing circuit 55 into the four bands, LL, HL, LH, and HH shown in FIG. 12. The B-Y signal supplied via the input terminal 53 is divided by the B-Y signal subband dividing circuit 56 into the four bands, LL, HL, LH, and HH shown in FIG. 12 The R-Y signal subband dividing circuit 55 and the B-Y signal subband dividing circuit 56 both operate in the same manner as the Y signal subband dividing circuit 54 described above.

The LL, HL, LH, and HH bands of the Y signal outputted from the Y signal subband dividing circuit 54, the LL, HL, LH, and HH bands of the R-Y signal outputted from the R-Y signal subband dividing circuit 55, and the LL, HL, LH, and HH bands of the B-Y signal outputted from the B-Y signal subband dividing circuit 56 are all transferred to the memory 57 where the subband-divided signals are stored up to eight fields. In the memory 57, three-dimensional blocks each comprising a plurality of neighboring pixels are organized in each band, and the created three-dimensional blocks are outputted block by block before the next eight fields are accumulated in the memory 57. Each three-dimensional block is formed, for example, by first grouping pixels on successive eight lines, with eight pixels per line, into a two-dimensional block and then grouping eight two-dimensional blocks, neighboring each other from one field to the next through the eight successive fields, into a three-dimensional block whose size is expressed as 8 pixels×8 lines×8 fields. The Y signal, R-Y signal, and B-Y signal organized in three-dimensional blocks are outputted from the memory 57 in the order of the LL band, HL band, LH band, and HH band. The blocks formed by thus organizing each of the LL band, HL band, LH band, and HH band are called subband blocks.

The subband blocks outputted from the subband dividing circuit 5 are transferred to the three-dimensional orthogonal transformation circuit 6 which performs a three-dimensional DCT on each subband block. The following describes the operation of the three-dimensional orthogonal transformation circuit 6 with reference to FIG. 9.

Figure 17:
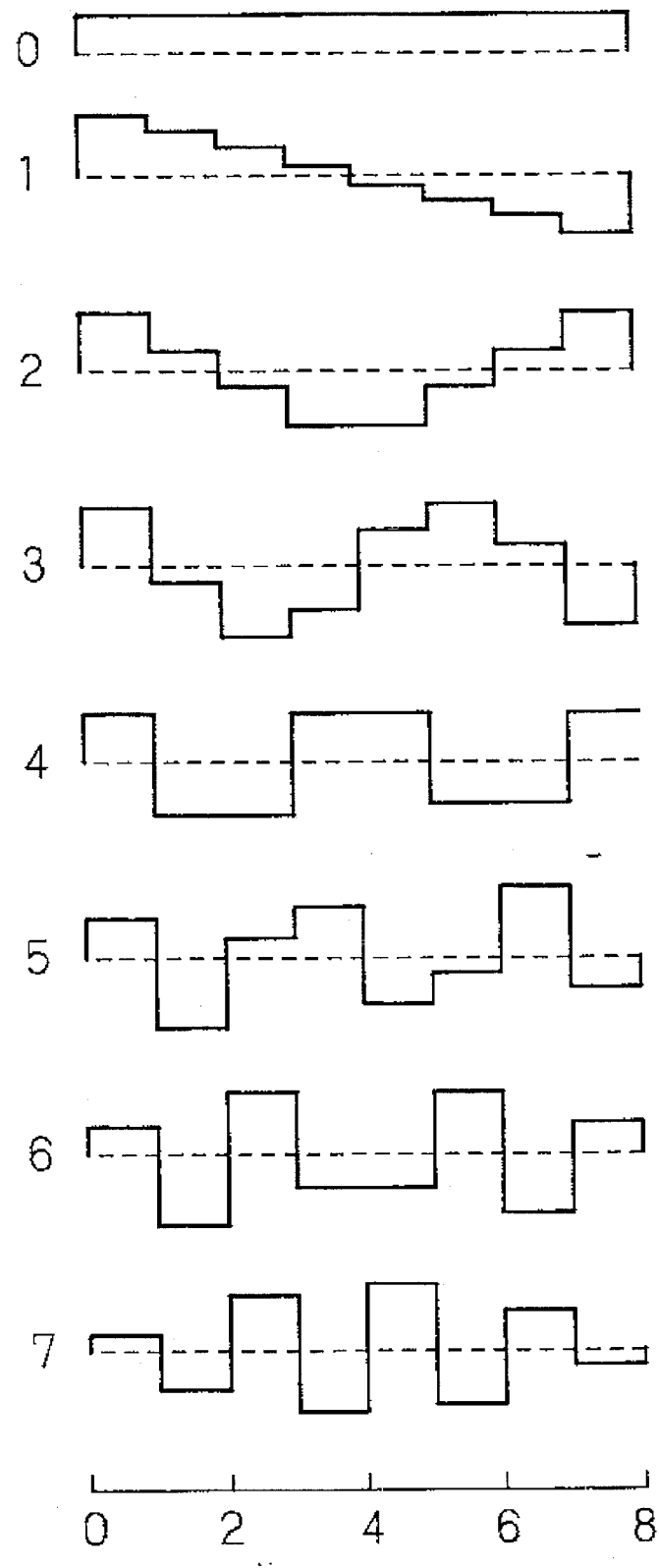
FIG. 17 is a diagram illustrating the basis functions of a DCT coefficient in 8-pixel DCT.

Each subband block of the Y signal, R-Y signal, and B-Y signal is supplied via the input terminal 61 to the orthogonal transformation circuit 62 where a three-dimensional DCT is performed on the subband block. The resulting transform coefficient is fed to the encoder 7 via the output terminal 66 as well as to the moving image/static image discrimination value computing circuit 63. FIG. 17 shows the basis function of an 8-pixel DCT coefficient. When the three-dimensional DCT coefficient is denoted as D(i, j, k) (i, j, k=0, 1, ..., 7), it can be said that the variation along the time direction within the block becomes greater as the power of higher order components in the time direction of the three-dimensional DCT coefficient increases. On the other hand, when we consider an 8×8×8-configured three-dimensional block, which is a collection of two-dimensional blocks of 8 pixels×8 lines taken from eight successive fields along the time direction, we find that, in the case of the NTSC signal, there is a high correlation between the two-dimensional blocks from field to field in the same frame. Therefore, to find the variation along the time direction, it can be seen from FIG. 17 that it is only necessary to examine the power of the coefficient at k=4 at which the sequence of the DCT coefficient varies from frame to frame. Accordingly, the maximum value of the DCT coefficient $D_{LL}$ (i, j, 4) at k=4 for the subband block of the LL band is used as a basis to discriminate the block between a moving image and a static image. Using the three-dimensional DCT coefficient $D_{LL}$ (i, j, k) for the LL band of each of the Y signal, R-Y signal, and B-Y signal, the moving image/static image discrimination value computing circuit 63 computes a discrimination value A from the following equation (1) and supplies the identification value A to the discriminating circuit 64.

$$A = Max\ (|D_{LL}\ (i, j, 4)|). \qquad (1)$$

On the other hand, the discrimination reference values B corresponding to the respective signals Y, R-Y, and B-Y for discriminating between a moving image and a static image are contained in the discrimination reference value table 65 constructed from a memory, and the required reference value is supplied to the discriminating circuit 64. The discriminating circuit 64 compares the discrimination value A supplied from the moving image/static image discrimination value computing circuit 63 with the discrimination reference value B supplied from the discrimination reference value table 65, and discriminates the subband block as a moving image when A≧B and as a static image when A<B. The discrimination result is supplied to the encoder 7 via the output terminal 67.

Figure 18:
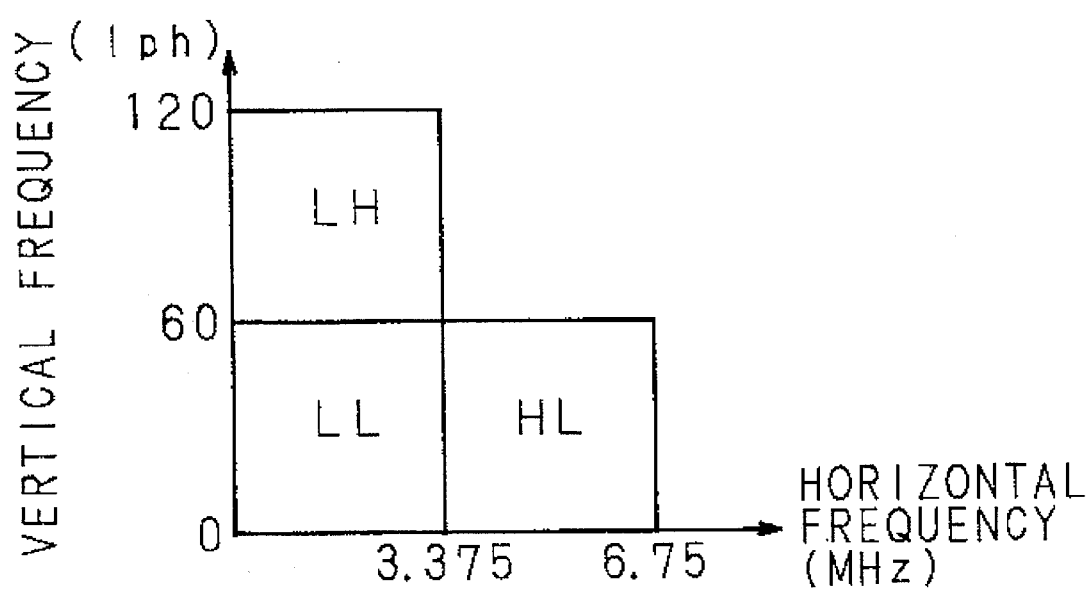
FIG. 18 is a diagram showing subbands of the Y signal which are to be encoded in the case of a moving image according to the first embodiment.
Figure 19:
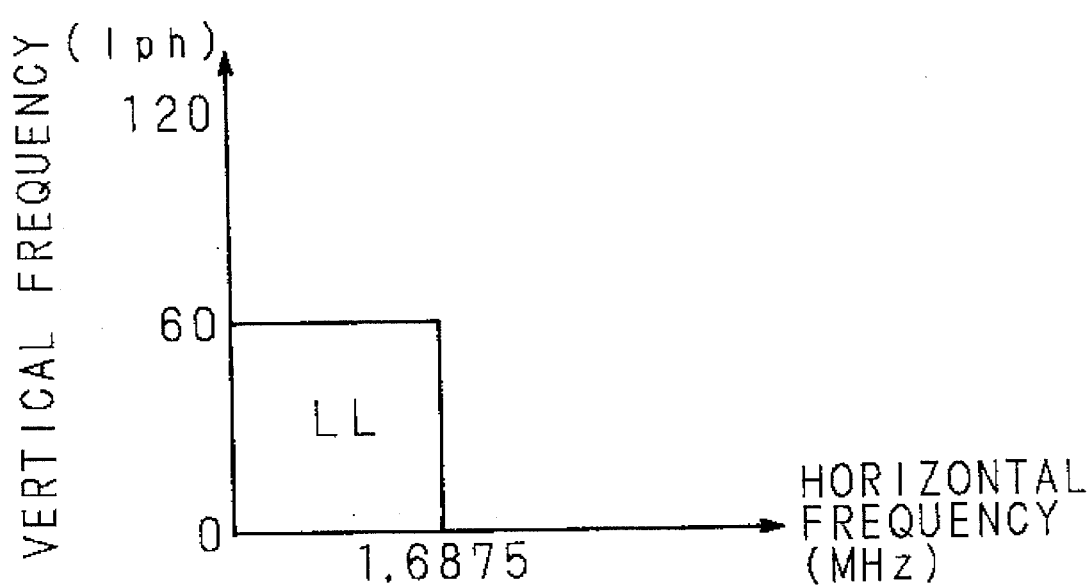
FIG. 19 is a diagram showing subbands of the R-Y signal and the B-Y signal which are to be encoded in the case of a moving image according to the first embodiment.

Based on this discrimination result, the encoder 7 quantizes and encodes the three-dimensional DCT coefficient. Since the human eye is mope sensitive to a static image than to a moving image, no subband block data may be dropped in the case of static image blocks, while in the case of moving image blocks, higher frequency components to which the human eye is less sensitive can be dropped without causing perceptible image degradation at the decoding side. When the subband block is discriminated as a static image by the three-dimensional orthogonal transformation circuit 6, the encoder 7 outputs block information indicating that the subband block is a static image and quantizes and encodes the three-dimensional DCT coefficients for all four subbands, LL, HL, LH, and HH. On the other hand, when the subband block is discriminated as a moving image by the three-dimensional orthogonal transformation circuit 6, the encoder 7 outputs block information indicating that the subband block is a moving image, and quantizes and encodes the three-dimensional DCT coefficients only for three subband blocks, LL, HL, and LH, for the Y signal, as shown in FIG. 18, and only for the LL band for each of the R-Y and B-Y signals, as shown in FIG. 19.

The operation of the decoding side will now be described.

The operation processes in the decoding side from the input terminal 11 to the output terminal 18 are the exact reverse of those in the encoding side from the input terminal 1 to the output terminal 8. The input data at the input terminal 11 is reconverted to the original three-dimensional data by means of the decoder 12, which is then inverse-DCTed by the three-dimensional inverse orthogonal transformation circuit 13. Each three-dimensional block, after inverse orthogonal transformation, is fed to the subband synthesis circuit 14 where four subbands are synthesized to produce one field.

The operation of the subband synthesis circuit 14 is the exact reverse of that of the subband dividing circuit 5. Each three-dimensional block is transferred via the input terminal 21 to the memory 22 for storage until eight fields of subband blocks are accumulated. The memory 22 directs the LL, HL, LH, and HH bands of the Y signal to the Y signal subband synthesis circuit 23, the LL, HL, LH, and HH bands of the R-Y signal to the R-Y signal subband synthesis circuit 24, and the LL, HL, LH, and HH bands of the B-Y signal to the B-Y signal subband synthesis circuit 25, one field at a time, before the next eight fields of subband blocks are accumulated in the memory 22.

The operation of the Y signal subband synthesis circuit 23 will now be described. The LL band of the Y signal delivered from the memory 22 is fed to the horizontal 1:2 interpolation circuit 232a where 0s are interpolated to double the number of pixels in the horizontal direction, after which the LL band is transferred to the horizontal LPF 233a having the frequency response shown in FIG. 15. On the other hand, the HL band of the Y signal delivered from the memory 22 is fed to the horizontal 1:2 interpolation circuit 232b where 0s are interpolated, after which the HL band is transferred to the horizontal HPF 234a having the frequency response shown in FIG. 16. The subtracter 235a subtracts the output of the horizontal HPF 234a from the output of the horizontal LPF 233a. The output of the subtracter 235a is fed to the vertical 1:2 interpolation circuit 236a where 0s are interpolated to double the number of pixels in the vertical direction, after which the output is transferred to the vertical LPF 237 having the frequency response shown in FIG. 13. On the other hand, the LH band of the Y signal delivered from the memory 22 is fed to the horizontal 1:2 interpolation circuit 232c where 0s are interpolated to double the number of pixels in the horizontal direction, after which the LH band is transferred to the horizontal LPF 233b having the frequency response shown in FIG. 15. The HH band of the Y signal delivered from the memory 22 is fed to the horizontal 1:2 interpolation circuit 232d where 0s are interpolated, after which the HH band is transferred to the horizontal HPF 234b having the frequency response shown in FIG. 16. The subtracter 235b subtracts the output of the horizontal HPF 234b from the output of the horizontal LPF 233b. The output of the subtracter 235b is fed to the vertical 1:2 interpolation circuit 236b where 0s are interpolated to double the number of pixels in the vertical direction, after which the output is transferred to the vertical HPF 238 having the frequency response shown in FIG. 14. The subtracter 239 subtracts the output of the vertical HPF 238 from the output of the vertical LPF 237 and outputs the result. The R-Y signal subband synthesis circuit 24 and the B-Y signal subband synthesis circuit 25 both operate in the same manner as the Y signal subband synthesis circuit 23 described above.

The Y signal, R-Y signal, and B-Y signal thus outputted from the subband synthesis circuit 14 are converted to analog signals by means of the D/A converter 15, which are further transformed to the Y signal, I signal, and Q signal by means of the matrix circuit 16. These signals are then converted by the NTSC encoder 17 to the NTSC color television signal for output at the output terminal 18.

We will now describe an example in which encoding and decoding were performed on a certain sample image. In this example, the sample image was divided in both the horizontal and vertical directions into a total of four frequency bands, i.e., LL band, HL band, LH band, and HH band, each of which was then organized into three-dimensional blocks each comprising 8 pixels×8 lines×8 fields. Each block was subjected to a three-dimensional orthogonal transform and a quantization, after which the original image was reproduced by performing a three-dimensional inverse orthogonal transform and a subband synthesis. Table 1 shows the results obtained by encoding four frames of such a sample image. The S/N ratio was calculated by the following equation.

TABLE 1

| | | | Method 1 | Method 2 |
|---|---|---|---|---|
| BIT RATE (Mbps) | LL band | Y | 9.34 Mbps | 9.34 |
| | | R-Y | 1.19 | 1.19 |
| | | B-Y | 1.54 | 1.54 |
| | | Total | 12.07 | 12.07 |
| | LH band | Y | 6.50 Mbps | 6.50 |
| | | R-Y | 0.49 | — |
| | | B-Y | 0.67 | — |
| | | Total | 7.65 | 6.50 |
| | HL band | Y | 1.96 Mbps | 1.96 |
| | | R-Y | 0.13 | — |
| | | B-Y | 0.22 | — |
| | | Total | 2.32 | 12.07 |
| | HH band | Y | 0.96 Mbps | — |
| | | R-Y | 0.07 | — |
| | | B-Y | 0.07 | — |
| | | Total | 1.08 | 0.00 |
| | Total | Y | 18.76 Mbps | 17.8 |
| | | R-Y | 1.87 | 1.19 |
| | | B-Y | 2.49 | 1.54 |
| | | Total | 23.12 | 20.53 |
| S/N (dB) | | Y | 38.5 dB | 37.6 |
| | | R-Y | 41.1 | 39.5 |
| | | B-Y | 40.1 | 37.8 |

$$S/N \text{ (dB)} = 10 \log_{10} \left\{ \frac{255^2}{\frac{1}{N} \sum_{i=1}^{N} (x_i - x_i')^2} \right\}$$

Xi: Original image value

X'i: Reconstructed image value

In Method 1, the subband-divided image was subjected to a three-dimensional orthogonal transform, and each of the resulting transform coefficients was multiplied by a suitable weight (1–0.4) according to the frequency band, the weighted transform coefficient then being scanned one-dimensionally for Huffman coding. Method 2 is the method contemplated by the present invention, in which each block was discriminated as a moving image or a static image, and in the case of a moving image, encoding was performed after dropping the HH band of the Y signal and the HL, LH, and HH bands of the R-Y and B-Y signals.

It can be seen from Table 1 that most of the main components are contained in the LL band and that the energy decreases in the order of the LH band, HL band, and HH band. Method 2, which embodies the present invention, achieves more than 10% reduction in the total bit rate compared with Method 1; in particular, the total bit rate is reduced by nearly 40% for the R-Y and B-Y signals. In Method 2, the S/N ratio decreases approximately 1 to 2 dB compared with Method 1, but the degradation in the reproduced image is almost indiscernible by eye in the case of an image consisting largely of moving image blocks.

Figure 20:
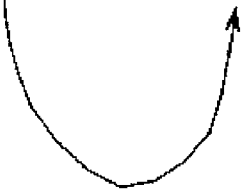
FIG. 20 is a diagram showing another example of subbands of the Y signal which are to be encoded in the case of a moving image according to the first embodiment.

The above embodiment has been described with respect to an example in which the HH band of the Y signal and the LH, HL, and HH bands of the R-Y and B-Y signals are dropped from each field when the subband block is discriminated as a moving image. Alternatively, selected bands may be dropped at predetermined intervals, as shown in FIG. 20. FIG. 20 shows an example in which selected bands of the Y signal are dropped at an interval of 8 fields, i.e., the LH and HL bands 3rd, 4th, 7th and 8th fields and the HH band in 3rd, 4th, 5th, 6th, 7th and 8th fields are dropped.

(Embodiment 2)

In the foregoing first embodiment, encoding is performed after dropping higher frequency subband blocks, but alternatively, each subband block may be discriminated as an effective image block or a noneffective image block on the basis of the image signal variance value, and encoding may be performed after dropping the subband blocks discriminated as noneffective blocks. In this case also, no appreciable image degradation is caused at the decoding side. The second embodiment described below employs this approach.

The overall configuration of the high-efficiency encoding apparatus of the second embodiment is the same as that of the first embodiment illustrated in FIG. 7, except that the configuration of the three-dimensional orthogonal transformation circuit 6 is partially different. In the second embodiment, the three-dimensional orthogonal transformation circuit 6 not only discriminates each subband block as a moving image or a static image on the basis of its transform coefficients, as in the first embodiment, but also judges whether the subband block is an effective image block or not.

Figure 21:
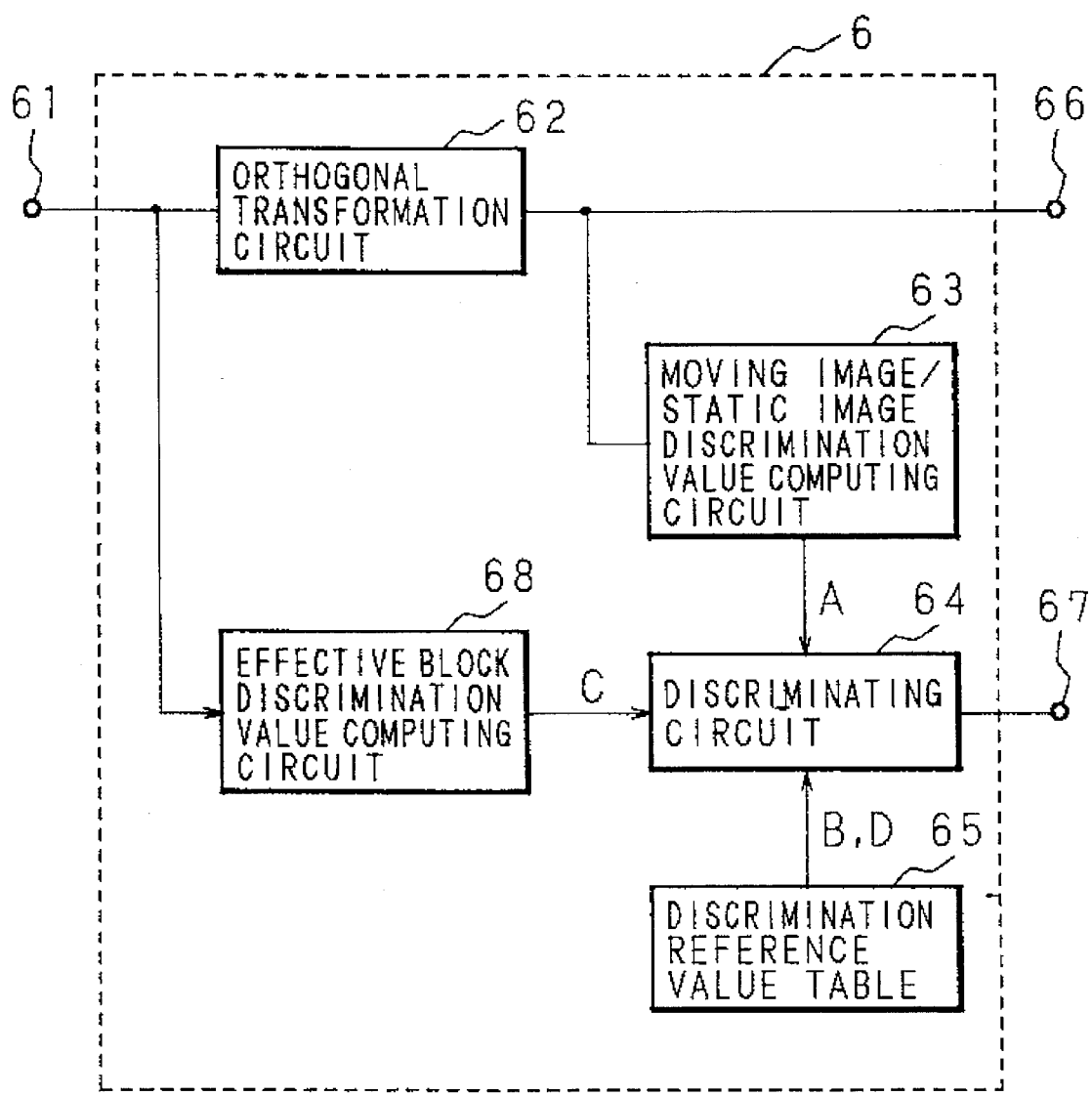
FIG. 21 is a block diagram illustrating the configuration of a three-dimensional orthogonal transformation circuit according to a second embodiment of the present invention.

FIG. 21 is a block diagram illustrating the configuration of the three-dimensional orthogonal transformation circuit 6. In FIG. 21, the same reference numerals as used in FIG. 9 indicate the same or corresponding elements. In the figure, the numeral 68 indicates an effective block discrimination value computing circuit which computes a discrimination value C from the magnitude of the image signal in each subband block, by which the subband block is discriminated as an effective image block or a noneffective image block. A discrimination reference value table 65, which is constructed from a memory, contains discrimination reference value B used as a basis of comparison when discriminating a moving image or a static image and discrimination; reference value D used as a basis of comparison when discriminating an effective image block or a noneffective image block. A discriminating circuit 64 discriminates the subband block as a moving image or a static image by comparing the discrimination value A supplied from a moving image/static image discrimination value computing circuit 63 with the discrimination reference value B supplied from the discrimination reference value table 65, and also discriminates the subband block as an effective image block or a noneffective image block by comparing the discrimination value C supplied from the effective block discrimination value computing circuit 68 with the discrimination reference value D supplied from the discrimination reference value table 65.

The operation of the second embodiment will be now described. The operation of other elements except the three-dimensional orthogonal transformation circuit 6 are the same as those described in the first embodiment; therefore, their description is omitted herein.

The subband blocks of the Y signal R-Y signal, and B-Y signal, supplied via the input terminal 61, are inputted to an orthogonal transformation circuit 62 where a three-dimensional DCT is performed on each subband block, and the resulting transform coefficient is fed to the encoder 7 via the output terminal 66 as well as to the moving image/static image discrimination value computing circuit 63. As in the first embodiment, the moving image/static image discrimination value computing circuit 68 computes a discrimination value A from the aforementioned equation (1), using the three-dimensional DCT coefficient $D_{LL}$ (i, j, k) for the LL band of each of the Y, R-Y, and B-Y signals, and supplies the discrimination value A to the discriminating circuit The subband blocks of the Y signal, R-Y signal, and B-Y signal, supplied via the input terminal 61, are also inputted to the effective block discrimination value computing circuit 68. From the image signal variance value within each subband block of the Y, R-Y, and B-Y signals, the effective block discrimination value computing circuit 68 computes a discrimination value C by which to discriminate the subband block as an effective image block or a noneffective image block. When the variance value in each block is denoted as $\sigma_{AC}^2$, the effective block discrimination value computing circuit 68 computes the discrimination value C from the following equation (2) and supplies the discrimination value C to the discriminating circuit 64.

$$C = \sigma_{AC}^2 / 512 \qquad (2)$$

The variance value $\sigma_{AC}^2$ is obtained by the following equation.

$$\sigma_{AC}^2 = \frac{1}{512} \sum_{i=0}^{7} \sum_{j=0}^{7} \sum_{k=0}^{7} \{X_m - X(i,j,k)\}^2$$

Xm: Mean value within the block

X(i, j, k): Each image signal within the block

On the other hand, the discrimination reference value B corresponding to the respective signals Y, R-Y, and B-Y for discriminating a moving image or a static image and the discrimination reference value D corresponding to the respective signals Y, R-Y, and B-Y for discriminating an effective image block or a noneffective image block are contained in the discrimination reference value table 65 constructed from a memory, and the required reference values are supplied to the discriminating circuit 64. The discriminating circuit 64 compares the discrimination value A supplied from the moving image/static image discrimination value computing circuit 63 with the discrimination reference value B supplied from the discrimination reference value table 65, and discriminates the subband block as a moving image if $A \geq B$ and as a static image if $A < B$. When the subband block is discriminated as a static image, the discriminating circuit 64 unconditionally decides that the subband block is an effective block. On the other hand, when the subband block is discriminated as a moving image, the discriminating circuit 64 compares the discrimination value C supplied from the effective block discrimination value computing circuit 68 with the discrimination reference value D supplied from the discrimination reference value table 65, and discriminates the subband block as an effective image block if $C \geq D$ and as a noneffective block if $C < D$. The discriminating circuit 64 supplies the thus obtained discrimination result to the encoder 7 via the output terminal 67.

Based on the supplied result, the encoder 7 quantizes and encodes the three-dimensional DCT coefficient. Since the human eye is more sensitive to a static image than to a moving image, no subband block data may be dropped in the case of static image blocks, but in the case of moving image blocks, subband blocks that do not have perceptible effects on the entire image can be dropped without causing appreciable image degradation at the decoding side. When the subband block is discriminated as an effective image block by the three-dimensional orthogonal transformation circuit 6, the encoder 7 outputs block information indicating that the subband block is an effective image block, and quantizes and encodes the three-dimensional DCT coefficients for all four subbands LL, HL, LH, and HH. On the other hand, when the subband block is discriminated as a noneffective image block by the three-dimensional orthogonal transformation circuit 6, the encoder 7 outputs block information indicating that the subband block is not an effective image block, and quantizes and encodes only the DC component of the three-dimensional DCT coefficients for the LL band of each of the Y, R-Y, and B-Y signals. For the HL, LH, and HH bands of each of the Y, R-Y and B-Y signals, on the other hand, the encoder 7 only outputs block information indicating that the subband block is not an effective image block, and does not quantizes their three-dimensional DCT coefficients.

At the decoding side, in the case of an effective image block, all transform coefficients are decoded. On the other hand, in the case of a noneffective image block, only the DC component of the transform coefficients for the LL band is decoded, and the AC components thereof are decoded as 0, while all transform coefficients for the HL, LH, and HH bands are decoded as 0.

We will now describe an example in which encoding and decoding were performed on a certain sample image. In this example, the sample image was divided in both the horizontal and vertical directions into a total of four frequency bands, i.e., LL band, HL band, LH band, and HH band, each of which was then organized into three-dimensional blocks each comprising 8 pixels×8 lines×8 fields. Each block was subjected to a three-dimensional orthogonal transform and a quantization, after which the original image was reproduced by performing a three-dimensional inverse orthogonal transform and a subband synthesis. Table 2 shows the result obtained by encoding four frames of such a sample image. The S/N ratio was calculated by the same equation as used in the first embodiment.

TABLE 2

|  |  | Method 1 | Method 2 |
|---|---|---|---|
| BIT RATE (Mbps) | Y | 9.85 Mbps | 9.85 |
|  | R-Y | 1.39 | 1.39 |
|  | B-Y | 1.78 | 1.78 |
|  | Y | 7.60 Mbps | 7.60 |
|  | R-Y | 0.71 | 0.05 |
|  | B-Y | 0.93 | 0.93 |
|  | Y | 2.89 | 1.72 |
|  | R-Y | 0.27 | 0 |
|  | B-Y | 0.41 | 0.01 |
|  | Y | 1.48 Mbps | 0.30 |
|  | R-Y | 0.09 | 0 |
|  | B-Y | 0.14 | 0 |
|  | Total | 27.53 | 22.85 |
| S/N (dB) | Y | 39.26 dB | 37.00 |
|  | R-Y | 42.04 | 39.47 |
|  | B-Y | 40.82 | 37.91 |

Method 1 is a conventional method in which encoding is performed without discriminating between a moving image and a static image and within discriminating between an effective and a noneffective image block. Method 2 is the method of this second embodiment, in which each subband block is discriminated as a moving or a static image and also as an effective image block or a noneffective image block; when the subband block is discriminated as a moving image and at the same time as a noneffective image block, only the DC component of the transform coefficients for the LL band is encoded. The discrimination reference value D used as a basis for the discrimination of an effective image block is set at 0 for the LL and LH bands of the Y signal, 0.2 for the HL and HH bands of the same, 0 for the LL band of each of the R-Y and B-Y signals, and 0.2 for the LH, HL, and HH bands of the same.

It can be seen from Table 2 that Method 2, which embodies the present invention, achieves a reduction by about 17% in the total bit rate compared with Method 1. In Method 2, the S/N ratio drops by about 2 to 3 dB compared with Method 1, but in the case of an image consisting largely of moving image blocks, this does not present a problem since the degradation in the reproduced image is almost indiscernible by eye.

In the above example, the variance value $\sigma_{AC}^2$ in each block is used as a basis for discriminating the block as an effective image block or a noneffective image block, but it is also possible to use the maximum value or dynamic range of each block as a basis for discriminating an effective block or a noneffective block. Also, for noneffective blocks, only the DC component of the LL band is encoded in the above example, but only the DC components of the other bands, i.e. LH, HL, and HH bands, may also be encoded.

Furthermore, in the above example, the subband block discriminated as a static image as a result of the moving image/static image discrimination is unconditionally rendered an effective block, but even when discriminated as a static image, the subband block may be discriminated as an effective image block or a noneffective image block by using a different discrimination reference value from that used for the discrimination of a moving image. Such an example is described below.

In the above example, only when discriminated as a moving image as a result of the moving/static image discrimination, the subband block is discriminated as an effective block when $C \geq D$ is satisfied. Alternatively, each subband block may be discriminated as an effective image block or a noneffective image block, using two different discrimination reference values, i.e. $D_A$ for a moving image and $D_S$ for a static image (where $D_A \geq D_S$). In this case, the discriminating circuit 64 evaluates each subband block of the LL, LH, HL, and HH bands, and discriminates the subband block as an effective image block when $C \geq D_A$ in the case of a moving image and when $C \geq D_S$ in the case of a static image.

(Embodiment 3)

The following description deals in detail with the third embodiment of the invention in which the weighting factor is varied according to whether the subband block is a moving image or a static image.

Figure 22:
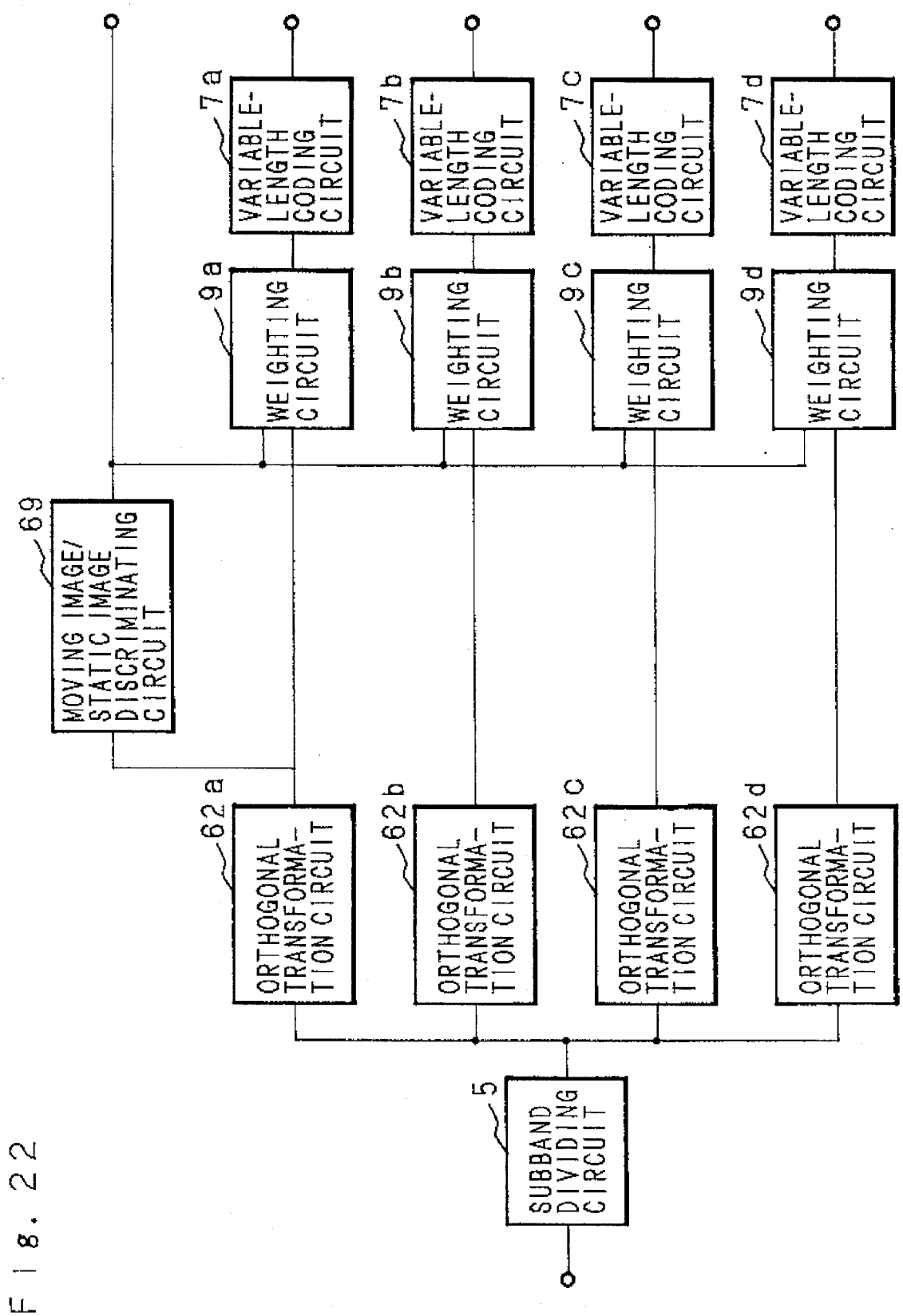
FIG. 22 is a block diagram illustrating the configuration of an encoding apparatus according to a third embodiment of the present invention.

FIG. 22 is a block diagram illustrating the major configuration of a high-efficiency encoding apparatus according to the third embodiment of the invention. In the figure, the reference numeral 5 designates the same subband dividing circuit as shown in FIG. 7. The subband dividing circuit 5 divides each of the digital image signals (Y, R-Y, and B-Y signals) into two frequency subbands in both the horizontal and vertical directions and further divides each subband into a plurality of blocks, the resulting subband blocks then being fed to orthogonal transformation circuits 62a, 62b, 62c, and 62d. The subband blocks of the LL band, HL band, LH band, and HH band, are inputted to the orthogonal transformation circuits 62a, 62b, 63c, and 63d, respectively. The orthogonal transformation circuits 62a, 62b, 62c, and 62d each perform a three-dimensional DCT on the supplied subband block and feed the resulting transform coefficients to weighting circuits 9a, 9b, 9c, and 9d. Based on the transform coefficient fed from the orthogonal transformation circuit 62a, a moving image/static image discriminating circuit 69 discriminates the block between a moving image and a static image and supplies the discrimination result to the weighting circuits 9a, 9b, 9c, and 9d. On the basis of the supplied result and the frequency response of the respective subband blocks, the weighting circuits 9a, 9b, 9c, and 9d assign weight to the transform coefficients fed from the orthogonal transformation circuits 62a, 62b, 62c, and 62d, and supply the weighted transform coefficients to variable-length coding circuits 7a, 7b, 7c, and 7d. The variable-length coding circuits 7a, 7b, 7c, and 7d encode the outputs of the weighting circuits 9a, 9b, 9c, and 9d, respectively, into variable-length code.

Figure 23:
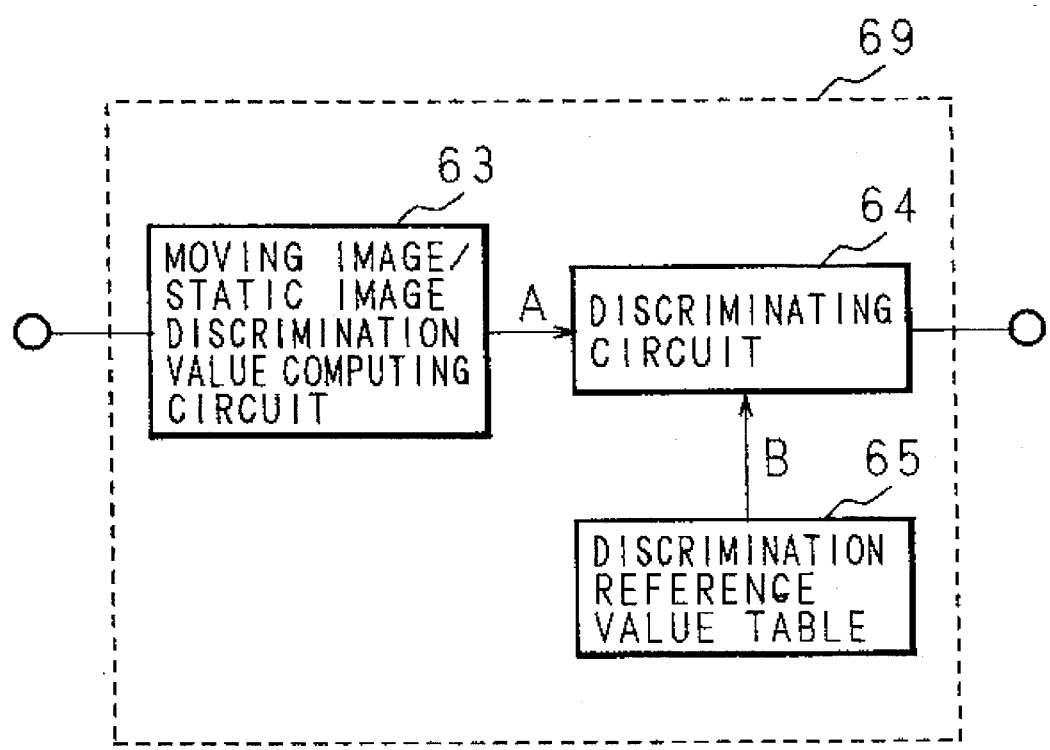
FIG. 23 is a block diagram illustrating the configuration of a moving image/static image discriminating circuit according to the third embodiment.

FIG. 23 illustrates the configuration of the moving image/static image discriminating circuit 69. The moving image/static image discriminating circuit 69 comprises: a moving image/static image discrimination value computing circuit 63 which computes on the basis of the transform coefficient supplied from the orthogonal transformation circuit 62a a discrimination value A by which to discriminate the subband block as a moving image or a static image; a discrimination reference value table 65 constructed from a memory and containing discrimination reference value B used as a basis of comparison when discriminating a moving image or a static image; and a discriminating circuit 64 for discriminating a moving image or a static image by comparing the discrimination value A supplied from the moving image/static image discrimination value computing circuit 63 with the discrimination reference value B supplied from the discrimination reference value table 65. These component elements are identical to those used in the first and second embodiments.

The operation of the third embodiment will now be described. Functional description of the subband dividing circuit 5 is not repeated herein since its operation is the same as that described in the first and second embodiments.

The subband blocks outputted from the subband dividing circuit 5 are fed to the orthogonal transformation circuits 62a, 62b, 62c, and 62d which perform a three-dimensional DCT on the respective subband blocks. The resulting transform coefficients are fed to the corresponding weighting circuits 9a, 9b, 9c, and 9d. It should be noted that the transform coefficient for the LL band is also fed to the moving image/static image discriminating circuit 69 from the orthogonal transformation circuit 62a. The supplied subband block is then discriminated as a moving image or a static image in exactly the same manner as in the first and second embodiments. The discrimination result is supplied to the weighting circuits 9a, 9b, 9c, and 9d which, on the basis of the supplied result, assign weight to the respective transform coefficients. In the configuration shown, the weighting circuit 9a corresponds to the LL band, the circuit 9b to the HL band, the circuit 9c to the LH band, and the circuit 9d to the HH band. The outputs of the weighting circuits 9a, 9b, 9c, and 9d are then supplied to the corresponding variable-length coding circuits 7a, 7b, 7c, and 7d for variable-length coding.

Next, we will describe how the weighting circuits 9a, 9b, 9c, and 9d operate and how the size of each weighting is determined.

First, we will describe the basic points to consider when assigning weight or a moving image and a static image. Since the human eye is more sensitive to a static image than to a moving image, it is effective to assign a larger weight to a static image block than to a moving image block. This applies to all subband blocks. Therefore, when the subband block is discriminated as a moving image block by the moving image/static image discriminating circuit 69, the weighting circuits 9a, 9b, 9c, and 9d assign smaller weight, and when the subband block is discriminated as a static image block, the weighting circuits 9a, 9b, 9c, and 9d assign larger weightings.

We performed a three-dimensional DCT on each of the four subband blocks of the Y signal of a certain sample image, quantized each subband block with 10 bits, and obtained the root mean squared value (RMS) of each transform coefficient X (i, j, k). Referring to the thus obtained RMS values, we will explain the difference in weighting between each subband block.

Tables 3 and 4 give the RMS values of the transform coefficients in the LL band of the Y signal.

From Tables 3 and 4, it can be seen that, in the LL band, the power is concentrated in the vicinity of (i, j)=(0, 0) when viewed in terms of blocks in the two-dimensional plane. Therefore, in the LL band, it is useful to assign, as shown in FIG. 24(a), larger weight to the transform coefficients of the lower sequence and smaller weight to the transform coefficients of the higher sequence in both the horizontal and vertical directions.

Tables 5 and 6 give the RMS values of the transform coefficients in the HL band of the Y signal.

From Tables 5 and 6, it can be seen that, in the HL band, the power is concentrated in the vicinity of (i, j)=(7, 0) when viewed in terms of blocks in the two-dimensional plane. This is because the HL band signal is folded in the horizontal direction. Therefore, in the HL band, it is useful to assign, as shown in FIG. 24(b), larger weight to the transform coefficients of the horizontally higher and vertically lower sequence and smaller weight to the transform coefficients of the horizontally lower and vertically higher sequence.

Tables 7 and 8 give the RMS values of the transform coefficients in the LH band of the Y signal.

Figure 25:
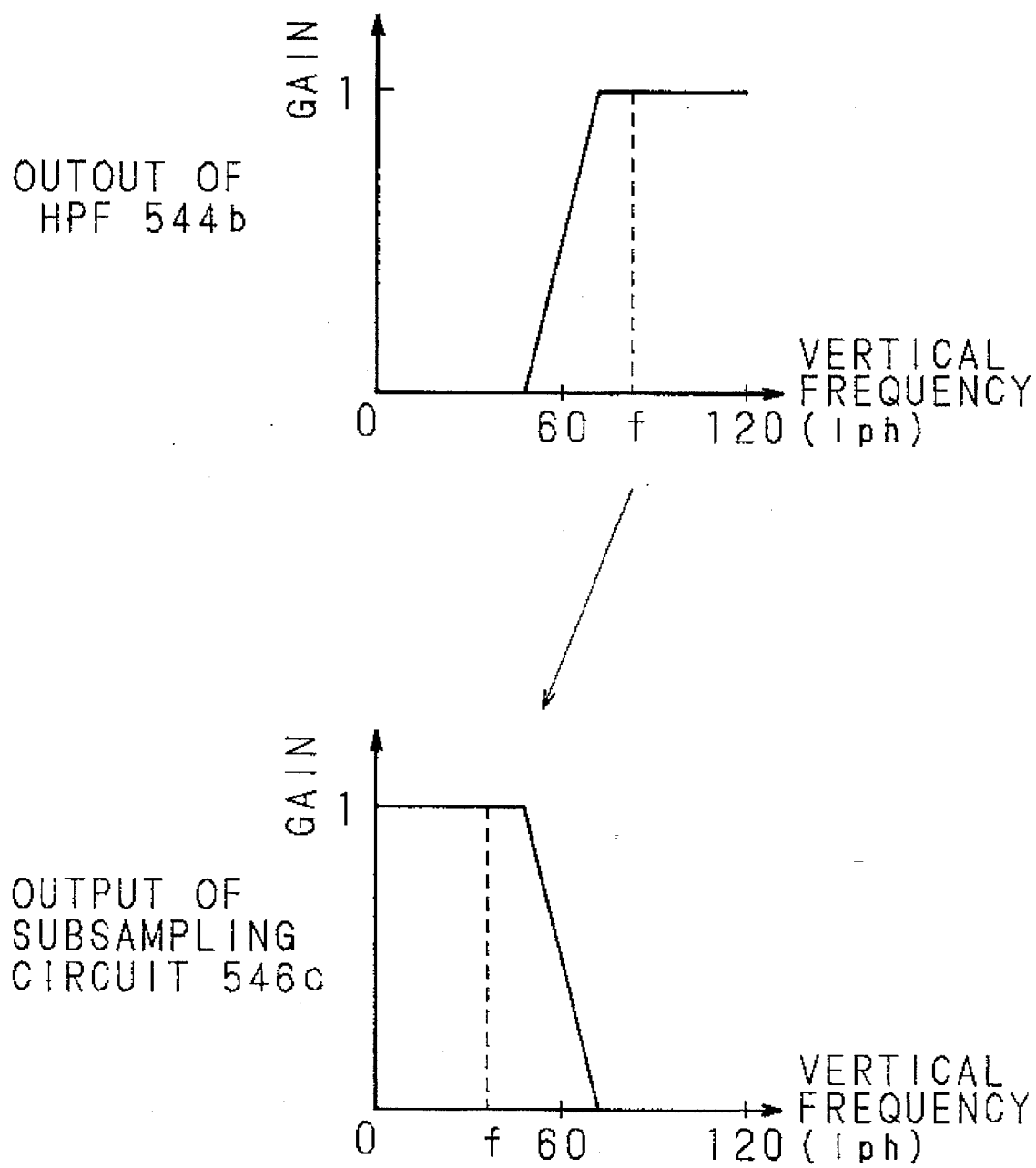
FIG. 25 is a diagram explaining the frequency folding action of a vertical HPF according to the third embodiment.

From Tables 7 and 8, it can be seen that, in the LH band, the power is concentrated in the vicinity of (i, j)= (0, 7) when viewed in terms of blocks in the two-dimensional plane. This is because the signal is sampled at 2:1 after passing through the vertical HPF 542 having the frequency response shown in FIG. 14. The LH component is a signal folded in the vertical direction, as shown in FIG. 25, wherein the signal 120 lph, for example, is rendered the signal 0 lph. Normally, the power of the transform coefficients after DCT should concentrate in the lower sequence in both directions, but in the above case, since the signal is folded in the vertical direction, the power concentrates in the higher sequence when taken in the vertical direction. Therefore, in the LH band, it is useful to assign, as shown in FIG. 24(c), larger weightings to the transform coefficients of the horizontally lower and vertically higher sequence and smaller weightings to the transform coefficients of the horizontally higher and vertically lower sequence.

Tables 9 and 10 give the RMS values in the HH band of the Y signal.

From Tables 9 and 10, it can be seen that, in the HH band, the power is concentrated in the vicinity of (i, j)=(7, 7). Therefore, in the HH band, it is useful to assign, as shown in FIG. 24(d), larger weightings to the transform coefficients of the higher sequence in both the vertical and horizontal directions and smaller weightings to the transform coefficients of the lower sequence in both the vertical and horizontal directions.

When the values in each table are viewed in the time direction, it can be seen that, in any band, the power is concentrated in the plane of k=0, the power decreasing as k becomes higher. Therefore, it is useful to assign larger weight to the transform coefficients with lower k and smaller weight to the transform coefficients with higher k. Furthermore, since the human eye is less sensitive to higher spatial frequencies, it is useful to assign larger weight to the LL band having a concentration of lower spatial frequencies and smaller weight to the HH band having a concentration of higher spatial frequencies.

When we consider the situation, in conjunction with the above weighting characteristics, where the weightings for each of the four subbands are to be assigned so as to smoothly continue in both the horizontal and vertical frequency directions, the weighting factor for each subband will be given as described below, where $\alpha s > \alpha m$.

When the subband block is discriminated as a moving image by the moving image/static image discriminating circuit 69, the weighting factor $W_{LLm}$ (i, j, k) for the LL band (corresponding to the weighting circuit 9a) will be given by the following equation $$W_{LLm}(i, j, k) =$$

$$\left\{ 1 - \frac{1-\alpha_m}{7} i \right\} \left\{ 1 - \frac{1-\alpha_m}{7} j \right\} \left\{ 1 - \frac{1-\alpha_t}{7} k \right\}$$

(i, j, k = 0, 1, . . . , 7)
(2/3 < $\alpha_m$ ≦ 1,  0 < $\alpha_t$ ≦ 1)

When the subband block is discriminated as a static image by the moving image/static image discriminating circuit 69, the weighting factor $W_{LLs}$ (i, j, k) for the LL band will be given by the following equation.

$$W_{LLs}(i, j, k) =$$

$$\left\{ 1 - \frac{1-\alpha_s}{7} i \right\} \left\{ 1 - \frac{1-\alpha_s}{7} j \right\} \left\{ 1 - \frac{1-\alpha_t}{7} k \right\}$$

(i, j, k = 0, 1, . . . , 7)
(2/3 < $\alpha_s$ ≦ 1,  0 < $\alpha_t$ ≦ 1)

When the subband block is discriminated as a moving image by the moving image/static image discriminating circuit 69, the weighting factor $W_{HLm}$ (i, j, k) for the HL band (corresponding to the weighting circuit 9b) will be given by the following equation.

$$W_{HLm}(i, j, k) =$$

$$\left\{ \alpha_m - \frac{1-\alpha_m}{7} (7-i) \right\} \left\{ 1 - \frac{1-\alpha_m}{7} j \right\} \left\{ 1 - \frac{1-\alpha_t}{7} k \right\}$$

(i, j, k = 0, 1, . . . , 7)
(2/3 < $\alpha_m$ ≦ 1,  0 < $\alpha_t$ ≦ 1)

When the subband block is discriminated as a static image by the moving image/static image discriminating circuit 69, the weighting factor $W_{HLs}$ (i, j, k) for the HL band will be given by the following equation.

$$W_{HLs}(i, j, k) =$$

$$\left\{ a_s \frac{1-\alpha_s}{7} (7-i) \right\} \left\{ 1 - \frac{1-\alpha_s}{7} j \right\} \left\{ 1 - \frac{1-\alpha_t}{7} k \right\}$$

(i, j, k = 0, 1, . . . , 7)
(2/3 < $\alpha_s$ ≦ 1,  0 < $\alpha_t$ ≦ 1)

When the subband block is discriminated as a moving image by the moving image/static image discriminating circuit 69, the weighting factor $W_{LHm}$ (i, j, k) for the LH band (corresponding to the weighting circuit 9c) will be given by the following equation.

$$W_{LHm}(i, j, k) = \left\{ 1 - \frac{1-\alpha_m}{7} i \right\} \left\{ \alpha_s - \frac{1-\alpha_m}{7} (7-j) \right\} \left\{ 1 - \frac{1-\alpha_t}{7} k \right\}$$

(i, j, k = 0, 1, . . . , 7)
(2/3 < $\alpha_m$ ≦ 1, 0 < $\alpha_t$ ≦ 1)

When the subband block is discriminated as a static image by the moving image/static image discriminating circuit 69, the weighting factor $W_{LHs}$ (i, j, k) for the LH band will be given by the following equation.

$$W_{LHs}(i, j, k) = \left\{ 1 - \frac{1-\alpha_s}{7} i \right\} \left\{ \alpha_s - \frac{1-\alpha_s}{7} (7-j) \right\} \left\{ 1 - \frac{1-\alpha_t}{7} k \right\}$$

(i, j, k = 0, 1, . . . , 7)
(2/3 < $\alpha_s$ ≦ 1, 0 < $\alpha_t$ ≦ 1)

When the subband block is discriminated as image by the moving image/static image discriminating circuit 69, the weighting factor $W_{HHm}$ (i, j, k) for the HH band (corresponding to the weighting circuit 9d) will be given by the following equation.

$$W_{HHm}(i, j, k) = \left\{ \alpha_m - \frac{1-\alpha_m}{7} (7-i) \right\} \left\{ \alpha_m - \frac{1-\alpha_m}{7} (7-j) \right\} \left\{ 1 - \frac{1-\alpha_t}{7} k \right\}$$

(i, j, k = 0, 1, . . . , 7)
(2/3 < $\alpha_m$ ≦ 1, 0 < $\alpha_t$ ≦ 1)

When the subband block is discriminated as a static image by the moving image/static image discriminating circuit 69, the weighting factor $W_{HHs}$ (i, j, k) for the HH band will be given by the following equation.

$$W_{HHs}(i, j, k) = \left\{ \alpha_s - \frac{1-\alpha_s}{7} (7-i) \right\} \left\{ \alpha_s - \frac{1-\alpha_s}{7} (7-j) \right\} \left\{ 1 - \frac{1-\alpha_t}{7} k \right\}$$

(i, j, k = 0, 1, . . . , 7)
(2/3 < $\alpha_s$ ≦ 1, 0 < $\alpha_t$ ≦ 1)

By discriminating between a moving image and a static image and assigning a different weighting for each subband, as described above, a further efficient data compression can be achieved with respect to the Y signal.

The above description has dealt with the Y signal, the luminance signal, but it will be appreciated that the exact same processing is also applicable to the R-Y and B-Y signals, the color-difference signals.

(Embodiment 4)

Figure 26:
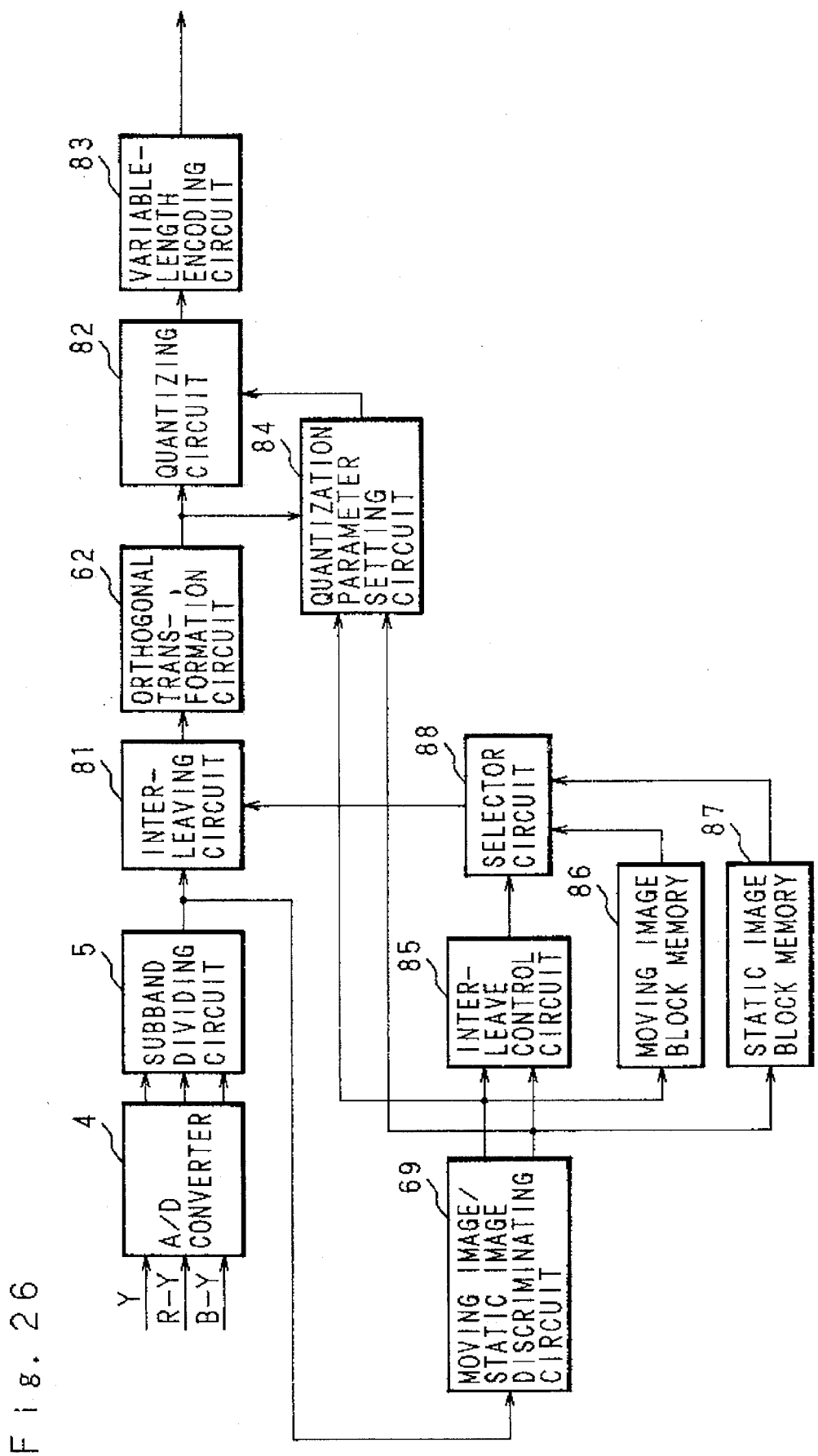
FIG. 26 is a block diagram illustrating the configuration of an encoding side of an encoding apparatus according to a fourth embodiment of the present invention.

FIG. 26 is a block diagram illustrating the configuration of an encoding side of a high-efficiency encoding apparatus according to a fourth embodiment of the present invention. In the figure, the reference numerals 4 and 5 respectively indicate the same A/D converter and subband dividing circuit as described in FIG. 7, the numeral 62 designates the same orthogonal transformation circuit as described in FIGS. 9 and 21, and the numeral 69 refers to the same moving image/static image discriminating circuit as described in FIG. 22.

As in the first embodiment, the subband dividing circuit 5 divides each of the image signals (Y, R-Y, and B-Y signals), digitized by the A/D converter 4, into four subbands according to the frequency, and further divides each subband into a plurality of blocks. The resulting subband blocks are then fed to an interleaving circuit 81 as well as to the moving image/static image discriminating circuit 69. The interleaving circuit 81 reorders the subband blocks in such a manner that the blocks neighboring each other at the time of input do not neighbor each other wherever possible, and supplies the thus reordered subband blocks to the orthogonal transformation circuit 62. The moving image/static image discriminating circuit 69 discriminates each subband block between a moving image and a static image, and supplies the discrimination result to a quantization parameter setting circuit 84. The orthogonal transformation circuit 62 performs a three-dimensional DCT on each subband block to obtain a transform coefficient and supplies the thus obtained transform coefficient to a quantizing circuit 82 as well as to the quantization parameter setting circuit 84. The quantizing circuit 82 quantizes the supplied transform coefficient in accordance with the quantization parameter set by the quantization parameter setting circuit 84, and transfers the quantized data to a variable-length encoding circuit 83 where the quantized data is encoded.

The block numbers of the subband blocks discriminated as moving image blocks by the moving image/static image discriminating circuit 69 are stored in a moving image block memory 86, while the block numbers of the subband blocks discriminated as static image blocks by the moving image/static image discriminating circuit 69 are stored in a static image block memory 87. The number of moving image blocks and the number of static image blocks discriminated by the moving image/static image discriminating circuit 69 are stored in an interleave control circuit 85 which controls a selector circuit 88 so that the interleaving circuit 81 shuffles the moving image blocks and the static image blocks independently of each other.

Figure 1:
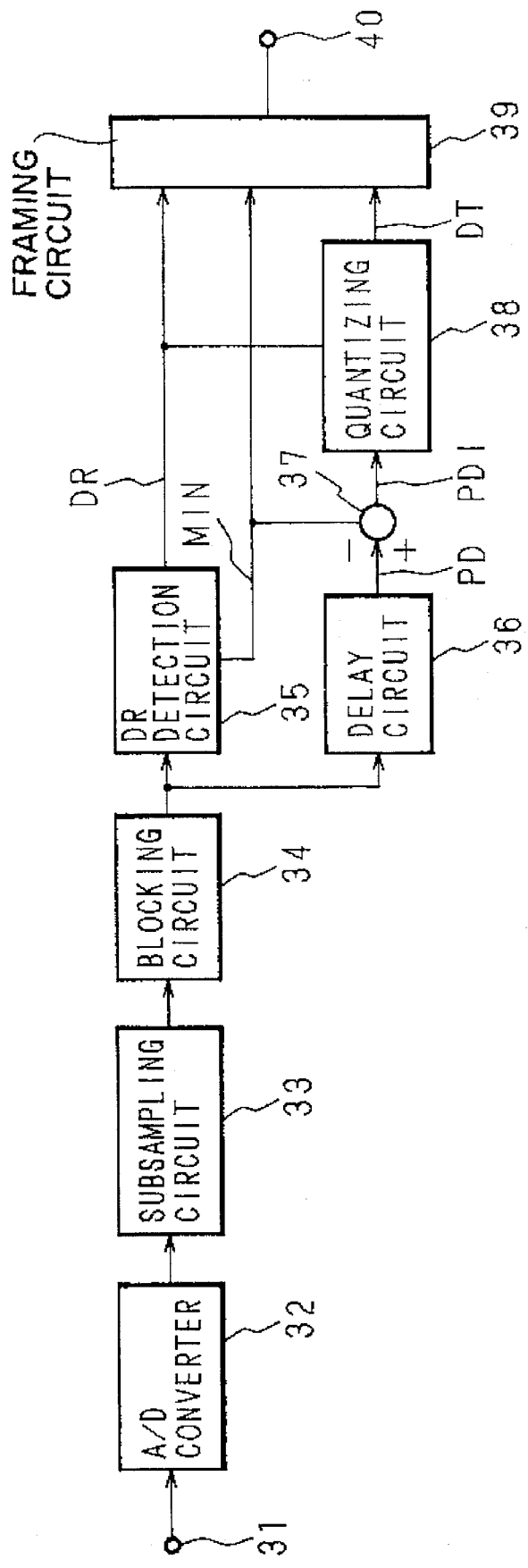
FIG. 1 is a block diagram illustrating the configuration of a transmitter side of a prior art encoding apparatus.
Figure 2:
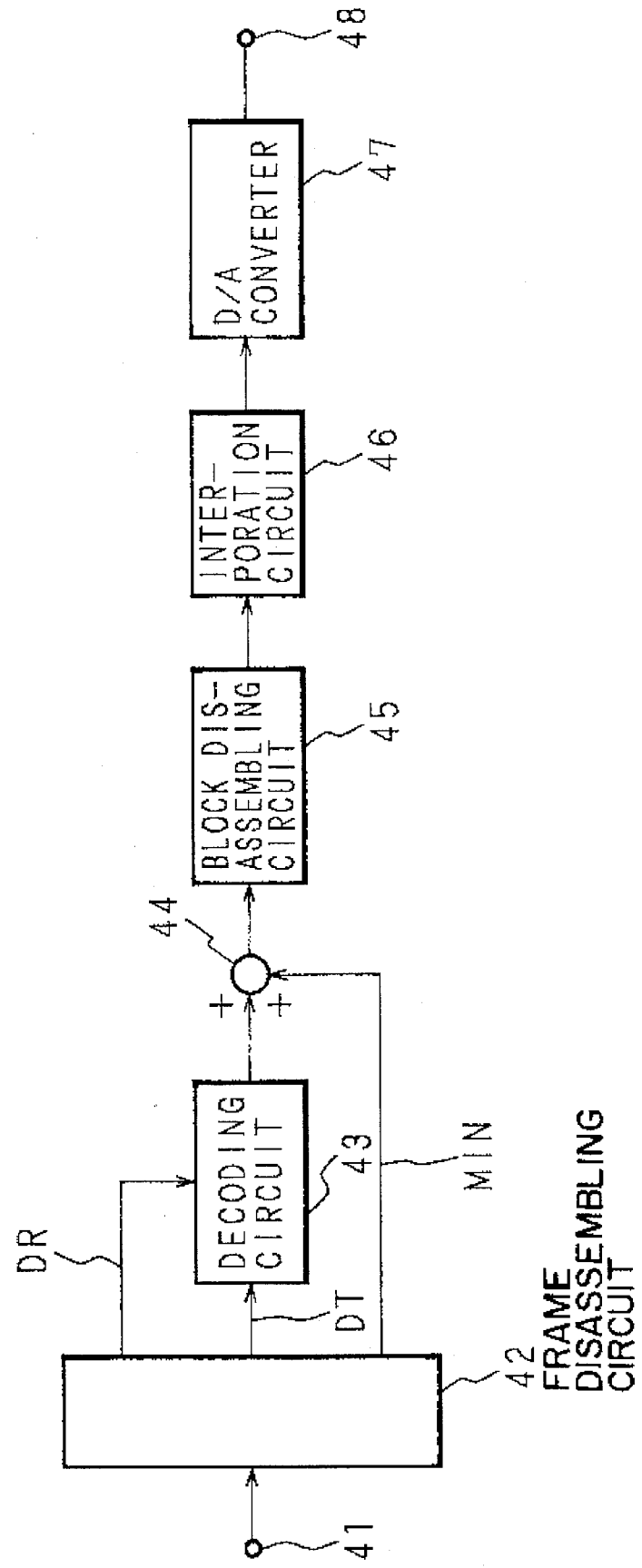
FIG. 2 is a block diagram illustrating the configuration of a receiver side of the prior art encoding apparatus.
Figure 3:
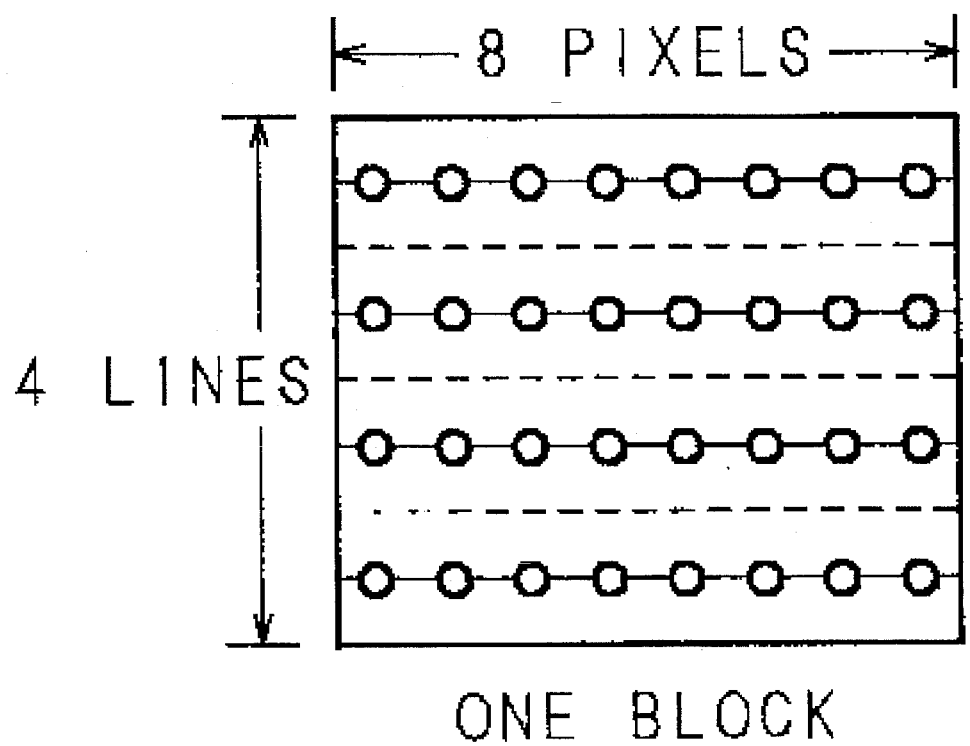
FIG. 3 is a diagram showing one example of signal sampling according to the prior art encoding apparatus.
Figure 4:
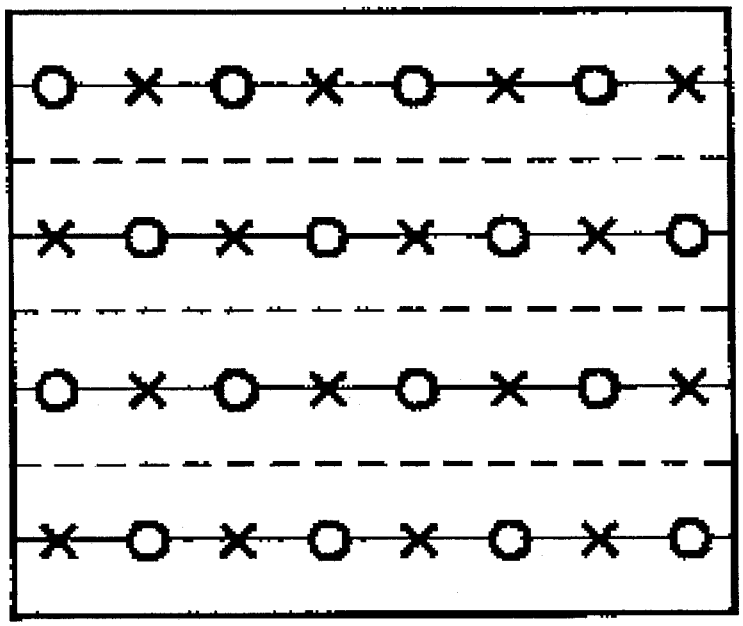
FIG. 4 is a diagram showing one example of signal subsampling according to the prior art encoding apparatus.
Figure 5:
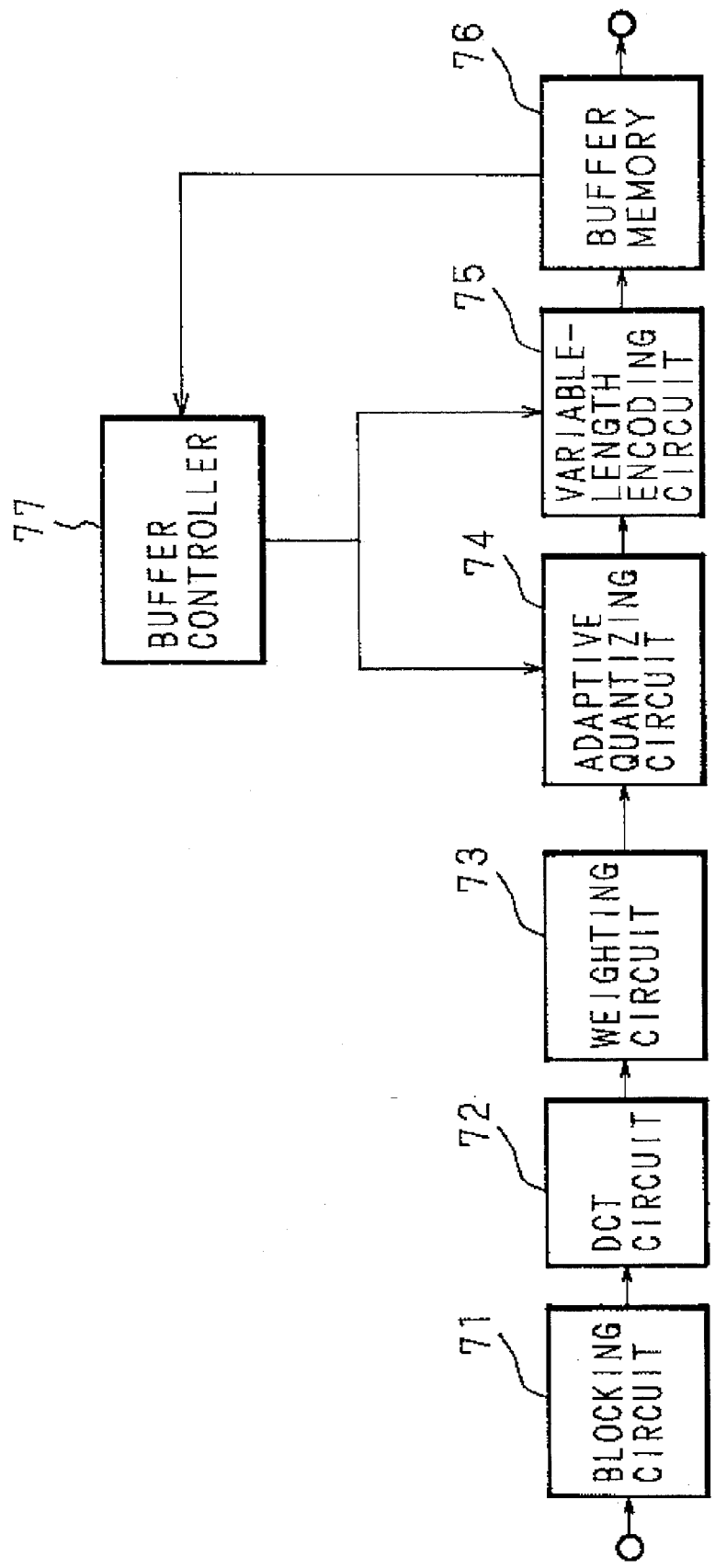
FIG. 5 is a block diagram illustrating the configuration of a prior art high-efficiency encoding apparatus.
Figure 6:
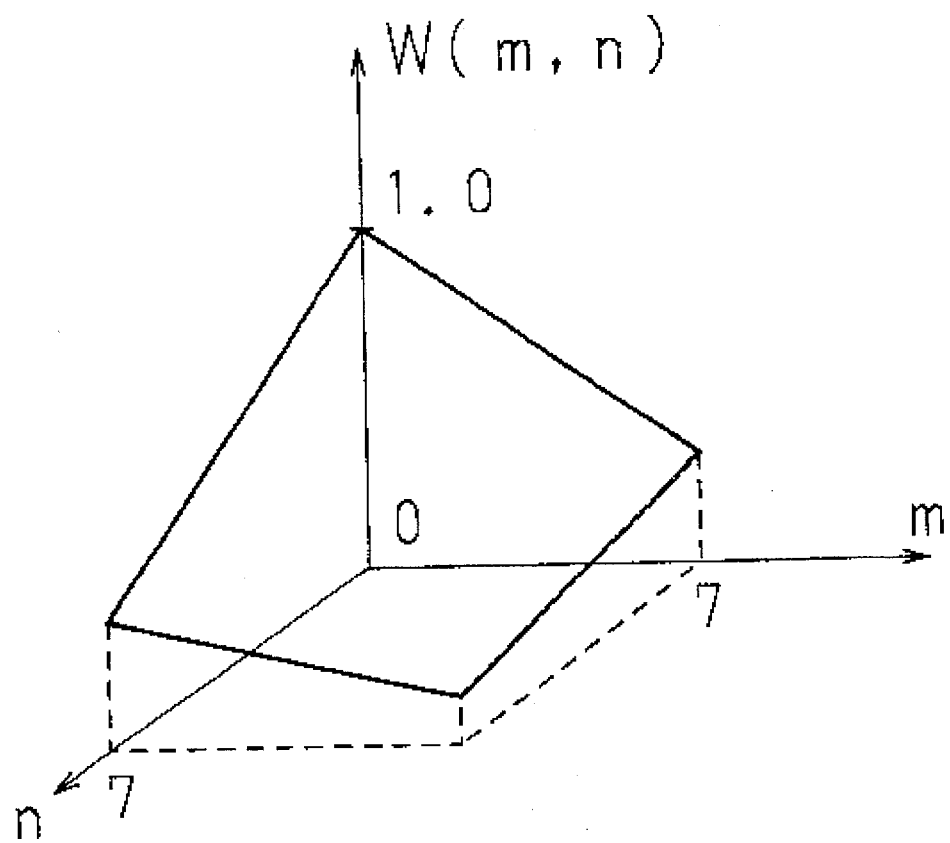
FIG. 6 is a diagram explaining how weightings are assigned by a weighting circuit according to the prior art high-efficiency encoding apparatus.
Figure 27:
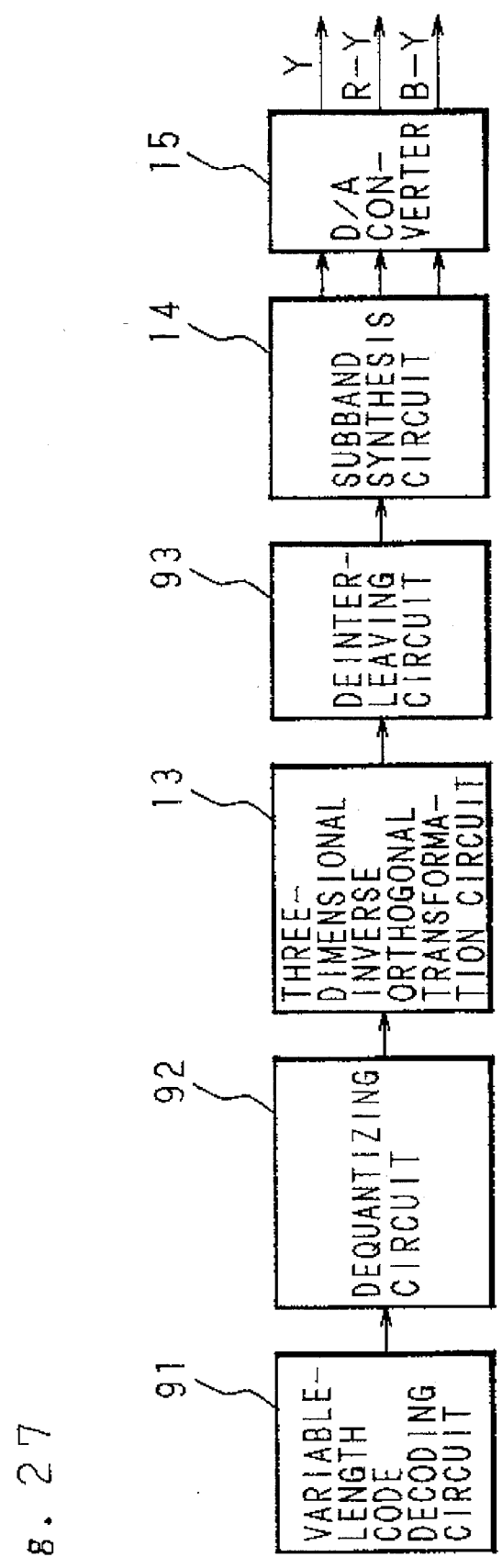
FIG. 27 is a block diagram illustrating the configuration of a decoding side according to the fourth embodiment.

FIG. 27 is a block diagram illustrating the configuration of a decoding side of the high-efficiency encoding apparatus of the fourth embodiment. In the figure, the reference numerals 13, 14, and 15 respectively indicate the same three-dimensional inverse orthogonal transformation circuit, subband synthesis circuit, and D/A converter as shown in FIG. 6. The numeral 91 designates a variable-length decoding circuit for decoding variable-length coded image signals. The variable-length decoding circuit 91 transfers the decoded data to a dequantizing circuit 92 which dequantizes the decoded data to obtain the original transform coefficient which is then fed to the three-dimensional inverse orthogonal transformation circuit 13. The three-dimensional inverse orthogonal transformation circuit 13 performs an inverse DCT on the transform coefficient and feeds the reconstructed subband block to a deinterleaving circuit 93. The deinterleaving circuit 93 reorders the subband blocks back into the original order and feeds the thus reordered subband blocks to the subband synthesis circuit 14. The subband synthesis circuit 14 synthesizes the subband blocks of each band to reproduce the original digital image signal which is then fed to the D/A converter 15. The D/A converter 15 converts the digital signal into analog form, thus producing the original image signal.

The operation of the fourth embodiment will now be described. Functional description of the A/D converter 4 and the subband dividing circuit 5 is omitted herein since their operations are the same as described in connection with the first embodiment.

Figure 28:
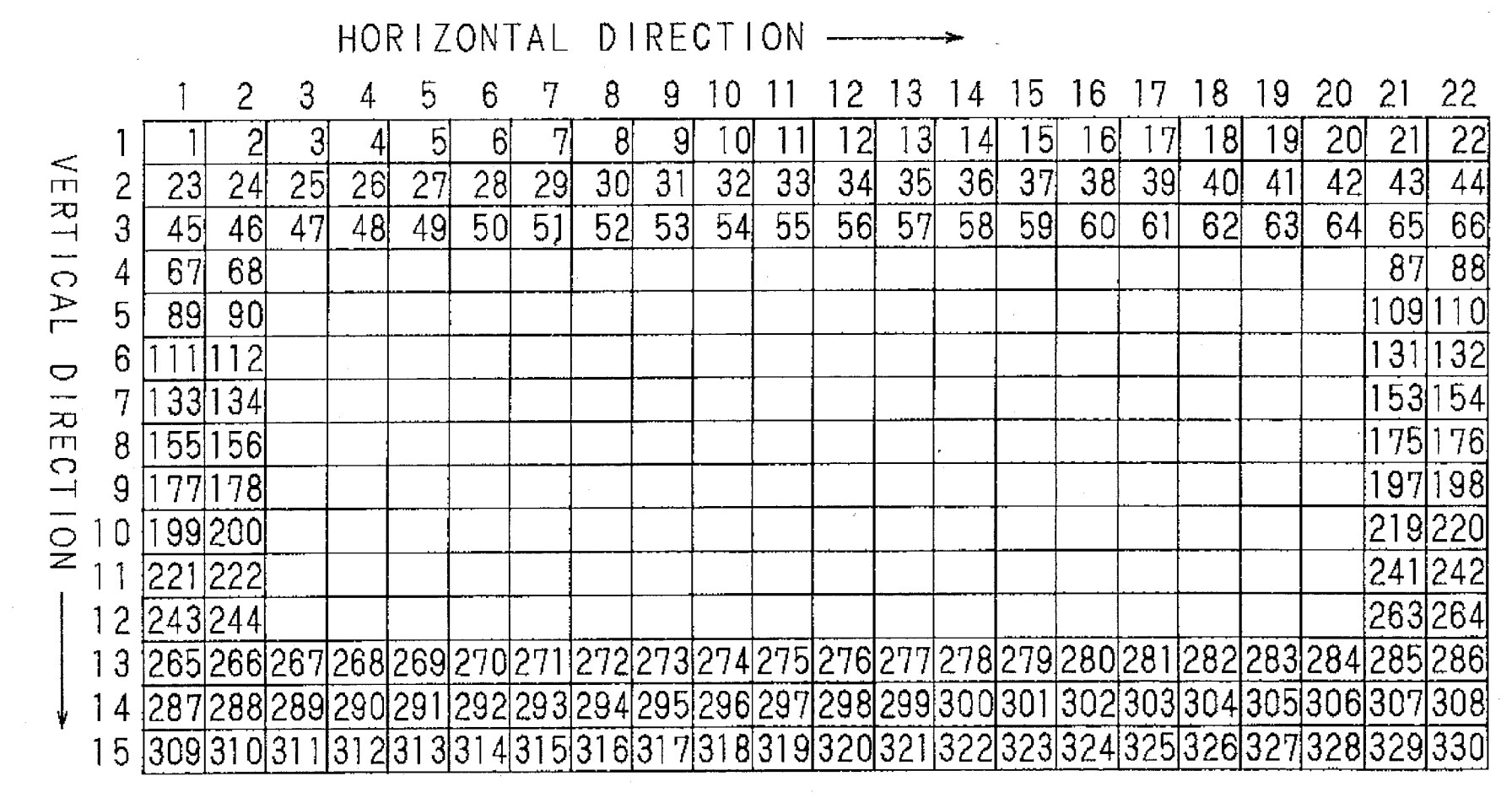

After each signal is divided into subbands by the subband dividing circuit. 5, when further dividing the Y signal into blocks each comprising 8 pixels (horizontal)×2×8 pixels (vertical) and the R-Y and B-Y signals into blocks each comprising 8 pixels (horizontal)×8 pixels (vertical), for example, the entire field is divided into a total of 380 blocks, 22 blocks (horizontal) by 15 blocks (vertical), as shown in FIG. 28. The thus created two-dimensional subband blocks of the Y, R-Y, and B-Y signals are stored in the memory 57 up to 8 fields and organized into three-dimensional subband blocks each comprising 8 pixels (horizontal)×8 pixels (vertical)×8 fields and thus having a horizontal axis, a vertical axis, and a time axis. These three-dimensional subband blocks are reordered by the interleaving circuit 81 in such a manner that the blocks neighboring each other at the time of input do not neighbor each other wherever possible in order to disperse the risk of signal loss during signal transmission, after which the subband blocks are transferred to the orthogonal transformation circuit 62.

Noting that the LL band is the base signal of an image, the moving image/static image discriminating circuit 69 detects the inter-frame correlation of the LL band within eight fields, by which each three-dimensional subband block is discriminated as a moving image or a static image. The block numbers of the subband blocks discriminated as moving image blocks by the moving image/static image discriminating circuit 69 are stored in the moving image block memory 86, and the block numbers of the subband blocks discriminated as static image blocks are stored in the static image block memory 87. The number of discriminated moving image blocks and the number of discriminated static image blocks are stored in the interleave control circuit 85. The subband signals inputted to the interleaving circuit 81 are shuffled with one block as a unit so that the subband blocks are reordered. In order to disperse the risk of signal loss during signal transmission, the subband blocks are reordered as shown in FIG. 29 so that the blocks neighboring each other at the time of input do not neighbor each other wherever possible and that the subband block signals are placed on the recording tracks (transmission units) in the order of the moving image blocks and static image blocks.

Since the three-dimensional DCT coefficients for a static image are such that the even-numbered coefficients, except the zeroth coefficient, are 0, as described hereinafter, the three-dimensional DCT coefficients may be used to discriminate between a moving image and a static image and the shuffling may be performed in blocks of DCT coefficients.

Figure 30A:
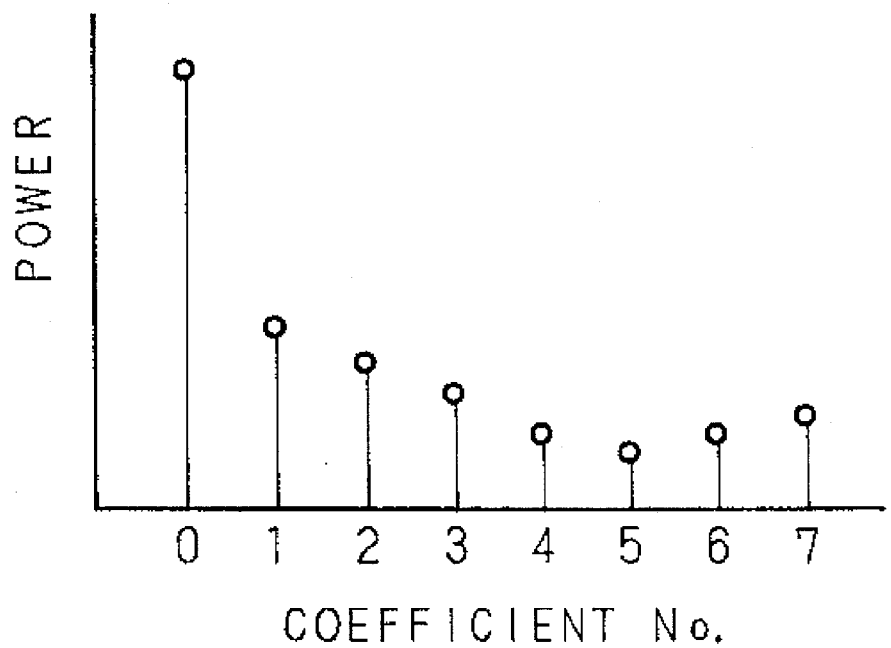
FIGS. 30(a) and (b) are diagrams showing power distribution of DCT coefficients for a moving image and a static image, respectively.
Figure 30B:
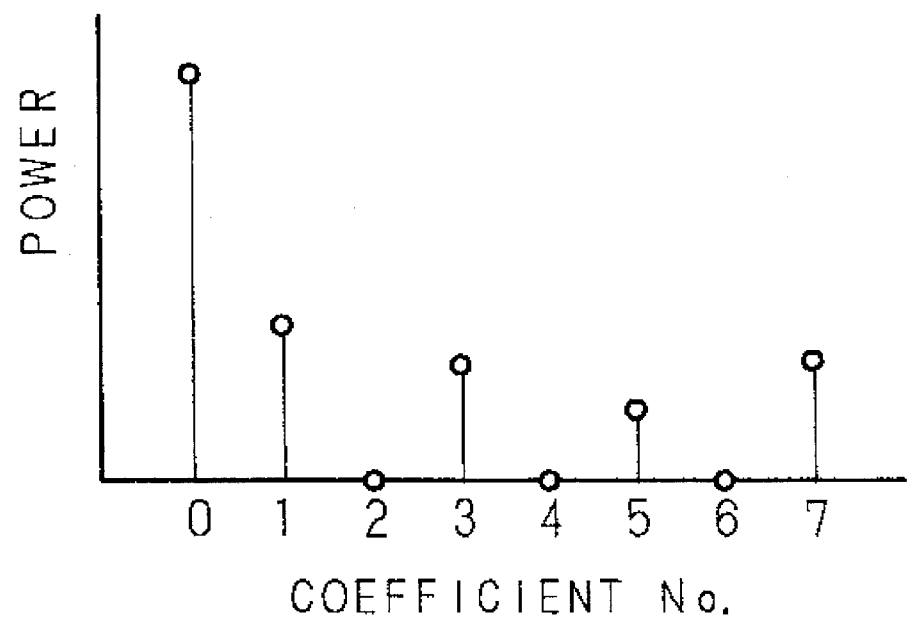

The subband block signals rearranged in the order of the moving image blocks and static image blocks are each transformed to DC coefficients through three-dimensional DCT by the orthogonal transformation circuit 62. FIG. 30 shows the power distribution of DCT coefficients along the time axis. FIG. 30(*a*) shows the power distribution in the case of a moving image, which shows that each coefficient has power, indicating the presence of a large data amount. FIG. 30(*b*) shows the power distribution in the case of a static image, which shows that the even-numbered coefficients, except the zeroth one, are 0, and besides, the power of the odd-numbered coefficients is small, thus indicating that the data amount is small. Normally, in the case of a static image, no information change should occur along the time axis, but since spatial displacement is converted to time displacement as a result of interlaced scanning, power appears in the odd-numbered DCT coefficients when the DC component is rendered the zeroth coefficient. This is related to the degree N of the base vector of the DCT, and in the case of 2:1 interlaced scanning, the even-numbered coefficient do not have power.

Using the definition equation for DCT, we will now explain the reason that power appears only in the odd-numbered DCT coefficients. An N-pixel DCT is defined by the following equation.

$$y(DC) = \frac{2}{N\sqrt{2}} \sum_{k=0}^{N-1} x(k)$$

$$y(i) = \frac{2}{N} \sum_{k=0}^{N-1} \left\{ x(k) \cdot \cos\frac{(2k+1)i}{2N} \pi \right\}$$

$$(i = 1, 2, \ldots, N-1)$$

Here, when we consider the odd-numbered and even-numbered fields separately, y(i) is expressed by the following equation.

$$y(i) = \frac{2}{N} \sum_{k=0}^{N/2-1} \left\{ x(2k) \cdot \cos\frac{(4k+1)i}{2N} \pi \right\} +$$

$$\frac{2}{N} \sum_{k=0}^{N/2-1} \left\{ x(2k+1) \cdot \cos\frac{(4k+3)i}{2N} \pi \right\}$$

$$(i = 1, 2, \ldots, N-1)$$

In the case of a static image, since the image signal remains the same between odd-numbered fields and between even-numbered fields, x(0)=x(2)=, . . . , =x(N−2) and x(1)=x(3)=, . . . , =x(N−1). Using this, y(i) can be further expressed by the following equation.

$$y(i) = \frac{2}{N} x(0) \cdot \sum_{k=0}^{N/2-1} \cos\frac{(4k+1)i}{2N} \pi +$$

$$\frac{2}{N} x(1) \cdot \sum_{k=0}^{N/2-1} \cos\frac{(4k+3)i}{2N} \pi$$

$$(i = 1, 2, \ldots, N-1)$$

In terms of a cosine function, since $\cos\alpha = -\cos(\pi-\alpha) = -\cos(\pi+\alpha) = \cos(2\pi-\alpha)$, when i=2, 4, 6, . . . , N−2, the following equations hold.

$$\sum_{k=0}^{N/2-1} \cos\frac{(4k+1)i}{2N} \pi = 0$$

$$\sum_{k=0}^{N/2-1} \cos\frac{(4k+3)i}{2N} \pi = 0$$

Thus, the even-numbered DCT coefficients, except the DC component, are rendered 0, while power appears in the odd-numbered DCT coefficients.

Each DCT coefficient obtained from each three-dimensional subband block is quantized by the quantizing circuit 82 using quantizing conditions that match its data amount, thus equalizing the data amount. For example, when a DCT coefficient (11 bits) whose quantization level is equivalent of 10.5 bits is multiplied by a quantization coefficient ½, a quantization level equivalent to 9.5 bits is obtained, and when it is multiplied by √2, a quantization level equivalent to 11.0 bits is obtained. In the case of a static image, since the data amount is small, the quantization coefficient is made large to allow transmission of as much data as possible so that detail image data can be transmitted. On the other hand, in the case of a moving image, since the data amount is large, it may not be possible to transmit all the data; therefore, the quantization coefficient is made small, dropping data pertaining to detail image portions to reduce the overall data amount. The quantization parameter such as the quantization coefficient used in the quantizing circuit 82 and the elimination of higher frequency components in each subband is determined by the quantization parameter setting circuit 84 on the basis of the discrimination result by the moving image/static image discriminating circuit 69 or by the power of the even-numbered DCT coefficients obtained from the orthogonal transformation circuit 62. It should be noted here that the quantization parameter setting is also affected by the data amount of each subband or DCT coefficient.

Each DCT coefficient quantized by the quantizing circuit 6 is variable-length coded by the variable-length coding circuit 83, using Huffman encoding or other method, to reduce the data amount, and the variable-length coded image signals (DCT coefficients) are outputted to complete a sequence of high-efficiency encoding operation.

In the above fourth embodiment, the moving image/static image discrimination is performed as an entire image (8 fields), and it is also possible to know the ratio between the moving image blocks and the static image blocks; therefore, even when a static image changes to a moving image or when the data amount abruptly changes as in a scene change, it is possible to set a proper quantization parameter.

The following describes an example of quantization parameter optimization and the advantages offered by this example. When a portion of a static image begins to move, the quantization coefficient is made slightly smaller just to enable the data of the moving image portion to be transmitted. In this case, it may not be possible to transmit the information of the static image portion, but since the immediately preceding image information can substitute, there occurs no problem in actual use. This serves to avoid an abrupt change in the quantization level that may cause an abrupt change in the image quality of the static image portion. On the other hand, when a substantial portion (for example, more than one-third) of a static image begins to move, the quantization coefficient is made substantially smaller. In this case, since the attention point is focused on the moving image portion, degradation in the static image portion is less perceptible. Furthermore, when a moving image changes to a static image, the quantization coefficient is made gradually larger. In this case, since the human eye cannot be quickly adjusted to perceive detail information, there occurs no problem in actual use. As described, according to the fourth embodiment of the invention, the quantization parameter can be so set as to match the situation, and image degradation associated with a change in the image and a change of the quantization coefficient can be easily avoided.

In the above example, each image signal is first divided into subbands and then into subband blocks, but it will be appreciated that the fourth embodiment is also applicable to a case where each image signal is divided directly into blocks without first dividing it into subbands.

In each of the above described embodiments, the subband blocks are organized by the subband dividing circuit 5 into blocks each comprising 8 pixels×8 lines×8 fields through successive fields, but alternatively, the blocks may be organized so that each block comprises 8 pixels×8 lines×8 frames through successive frames. In the latter case, each block should be discriminated as a moving image of a static image on the basis; of the amplitude of the DCT coefficient when k=7. More specifically, for the three-dimensional DCT coefficient $D_{LL}$ (i, j, k) (i, j, k=0, 1, . . . , 7) in the LL band of the Y signal (or the R-Y or B-Y signal), the value A expressed by the following equation (3) is supplied to the discriminating circuit 64, and this discrimination value A is compared with the discrimination reference value B, to discriminate a moving image or a static image.

$$A = MAX \ (|D_{LL} \ (i, j, 7)|) \tag{3}$$

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 3

| | | | | | | | |
|---|---|---|---|---|---|---|---|
| k = 0 | | | | | | | |
| 407.48 | 47.45 | 23.12 | 15.73 | 10.09 | 6.30 | 4.47 | 2.87 |
| 57.91 | 22.37 | 14.95 | 9.56 | 6.14 | 4.76 | 3.62 | 2.09 |
| 43.20 | 18.54 | 12.10 | 8.51 | 6.70 | 4.08 | 3.12 | 2.02 |
| 30.87 | 14.32 | 10.70 | 6.86 | 5.21 | 3.46 | 2.74 | 1.80 |
| 21.90 | 12.71 | 8.99 | 6.75 | 4.56 | 3.73 | 2.65 | 1.81 |
| 16.39 | 10.70 | 7.90 | 5.64 | 4.39 | 3.40 | 2.11 | 1.64 |
| 13.77 | 9.80 | 7.41 | 5.16 | 3.58 | 2.59 | 2.01 | 1.68 |
| 10.64 | 7.79 | 6.70 | 4.53 | 3.24 | 2.37 | 1.79 | 1.17 |
| k = 1 | | | | | | | |
| 21.68 | 19.90 | 19.23 | 11.77 | 8.06 | 5.82 | 4.28 | 2.84 |
| 16.41 | 16.56 | 13.64 | 9.52 | 6.58 | 4.69 | 3.39 | 2.67 |
| 12.99 | 11.90 | 10.54 | 7.72 | 5.50 | 4.38 | 3.41 | 2.55 |
| 11.52 | 9.85 | 8.57 | 6.70 | 5.18 | 3.72 | 2.80 | 2.22 |
| 10.36 | 8.64 | 7.62 | 6.23 | 4.40 | 3.61 | 2.69 | 2.09 |
| 9.97 | 7.22 | 7.24 | 5.20 | 3.87 | 3.25 | 2.42 | 1.71 |
| 8.40 | 7.12 | 5.67 | 4.83 | 3.54 | 2.87 | 2.06 | 1.66 |
| 7.15 | 5.84 | 5.17 | 3.93 | 2.90 | 2.44 | 1.94 | 1.37 |
| k = 2 | | | | | | | |
| 6.66 | 11.75 | 13.40 | 11.21 | 8.10 | 4.94 | 3.17 | 2.45 |
| 6.40 | 9.05 | 10.89 | 9.94 | 7.05 | 4.46 | 3.12 | 1.96 |
| 5.31 | 7.90 | 8.50 | 7.75 | 5.62 | 3.97 | 2.63 | 2.05 |
| 5.15 | 6.71 | 7.72 | 7.48 | 4.91 | 3.71 | 2.43 | 1.89 |
| 5.06 | 5.97 | 7.14 | 6.03 | 4.49 | 3.27 | 2.35 | 1.83 |
| 4.32 | 5.94 | 5.45 | 5.33 | 3.52 | 2.70 | 1.88 | 1.46 |
| 5.05 | 4.69 | 5.12 | 4.48 | 3.58 | 2.43 | 1.83 | 1.39 |
| 4.76 | 4.53 | 3.93 | 3.78 | 2.73 | 2.12 | 1.64 | 1.29 |
| k = 3 | | | | | | | |
| 3.23 | 4.53 | 7.10 | 9.08 | 7.27 | 5.78 | 3.37 | 1.98 |
| 2.98 | 4.31 | 6.45 | 7.42 | 6.96 | 5.94 | 3.42 | 1.97 |
| 2.38 | 3.87 | 5.60 | 6.52 | 6.23 | 4.68 | 3.02 | 2.02 |
| 2.27 | 3.38 | 5.08 | 5.81 | 5.55 | 4.27 | 2.61 | 1.52 |
| 2.17 | 3.29 | 4.33 | 5.49 | 4.69 | 3.65 | 2.68 | 1.63 |
| 2.52 | 3.24 | 4.40 | 4.44 | 4.24 | 2.78 | 2.35 | 1.39 |
| 2.68 | 3.48 | 3.70 | 4.00 | 3.85 | 2.66 | 2.00 | 1.35 |
| 2.63 | 2.93 | 3.52 | 3.13 | 3.12 | 2.45 | 1.56 | 1.15 |

TABLE 4

| | | | | | | | |
|---|---|---|---|---|---|---|---|
| k = 4 | | | | | | | |
| 2.08 | 2.63 | 3.78 | 4.47 | 5.58 | 5.30 | 4.22 | 2.42 |
| 1.87 | 2.36 | 3.24 | 4.67 | 5.36 | 5.31 | 3.90 | 2.65 |
| 1.76 | 2.32 | 3.16 | 4.53 | 5.44 | 5.12 | 3.88 | 2.41 |
| 1.81 | 2.11 | 2.67 | 3.85 | 5.05 | 4.78 | 3.28 | 2.02 |
| 1.61 | 1.99 | 2.80 | 3.81 | 4.59 | 4.21 | 3.26 | 2.13 |
| 1.57 | 2.26 | 2.95 | 3.73 | 4.00 | 4.16 | 2.83 | 2.03 |
| 1.67 | 2.35 | 2.90 | 3.84 | 4.16 | 3.15 | 2.79 | 1.69 |

TABLE 4-continued

|  |  |  |  |  |  |  |  |
|---|---|---|---|---|---|---|---|
| 1.67 | 2.20 | 3.10 | 3.44 | 3.49 | 3.03 | 2.50 | 1.36 |
| k = 5 |  |  |  |  |  |  |  |
| 1.81 | 1.46 | 1.92 | 2.44 | 3.33 | 3.85 | 3.58 | 2.70 |
| 2.16 | 1.52 | 1.86 | 2.26 | 3.08 | 3.37 | 3.22 | 2.41 |
| 1.82 | 1.58 | 1.99 | 2.51 | 3.16 | 3.34 | 3.32 | 2.35 |
| 1.54 | 1.74 | 1.92 | 2.11 | 2.88 | 3.31 | 2.92 | 2.20 |
| 1.57 | 1.64 | 1.90 | 2.35 | 2.56 | 3.12 | 3.07 | 2.13 |
| 1.84 | 1.73 | 2.00 | 2.24 | 2.40 | 2.64 | 2.81 | 1.84 |
| 2.08 | 1.91 | 1.87 | 2.12 | 2.22 | 2.33 | 2.12 | 1.82 |
| 2.14 | 1.74 | 1.92 | 2.05 | 2.07 | 2.12 | 1.91 | 1.49 |
| k = 6 |  |  |  |  |  |  |  |
| 1.11 | 1.17 | 1.22 | 1.38 | 1.66 | 2.05 | 2.66 | 2.27 |
| 1.42 | 1.35 | 1.32 | 1.34 | 1.71 | 2.20 | 2.30 | 2.21 |
| 1.70 | 1.56 | 1.53 | 1.42 | 1.88 | 2.24 | 2.29 | 2.15 |
| 1.88 | 1.81 | 1.67 | 1.62 | 1.69 | 2.10 | 2.21 | 1.98 |
| 2.17 | 1.91 | 1.79 | 1.52 | 1.79 | 2.00 | 2.36 | 1.94 |
| 2.10 | 2.09 | 1.75 | 1.76 | 1.62 | 1.94 | 2.04 | 1.95 |
| 2.47 | 1.96 | 1.99 | 1.63 | 1.53 | 1.83 | 1.90 | 1.66 |
| 2.47 | 2.15 | 1.94 | 1.82 | 1.59 | 1.62 | 1.79 | 1.59 |
| k = 7 |  |  |  |  |  |  |  |
| 4.22 | 1.32 | 1.04 | 0.91 | 1.02 | 1.26 | 1.85 | 1.64 |
| 5.62 | 1.87 | 1.36 | 1.11 | 1.04 | 1.36 | 1.67 | 1.68 |
| 4.84 | 2.13 | 1.56 | 1.21 | 1.22 | 1.39 | 1.77 | 1.60 |
| 3.84 | 2.36 | 1.76 | 1.39 | 1.28 | 1.30 | 1.55 | 1.53 |
| 3.92 | 2.47 | 2.00 | 1.44 | 1.24 | 1.42 | 1.49 | 1.51 |
| 4.42 | 2.92 | 2.19 | 1.65 | 1.34 | 1.48 | 1.39 | 1.57 |
| 5.06 | 3.03 | 2.37 | 1.66 | 1.46 | 1.28 | 1.37 | 1.43 |
| 4.79 | 2.90 | 2.41 | 1.79 | 1.49 | 1.31 | 1.34 | 1.29 |

TABLE 5

|  |  |  |  |  |  |  |  |
|---|---|---|---|---|---|---|---|
| k = 0 |  |  |  |  |  |  |  |
| 0.25 | 0.35 | 0.40 | 0.48 | 0.68 | 1.00 | 1.68 | 1.98 |
| 0.20 | 0.24 | 0.32 | 0.33 | 0.51 | 0.62 | 0.99 | 1.45 |
| 0.17 | 0.29 | 0.30 | 0.34 | 0.47 | 0.66 | 1.00 | 1.46 |
| 0.13 | 0.23 | 0.25 | 0.29 | 0.36 | 0.58 | 0.85 | 1.31 |
| 0.14 | 0.22 | 0.22 | 0.29 | 0.35 | 0.49 | 0.81 | 1.19 |
| 0.14 | 0.20 | 0.27 | 0.29 | 0.35 | 0.55 | 0.78 | 0.99 |
| 0.14 | 0.20 | 0.23 | 0.31 | 0.35 | 0.51 | 0.78 | 0.97 |
| 0.07 | 0.17 | 0.19 | 0.22 | 0.29 | 0.49 | 0.62 | 0.85 |
| k = 1 |  |  |  |  |  |  |  |
| 0.25 | 0.36 | 0.36 | 0.47 | 0.61 | 1.02 | 1.54 | 2.05 |
| 0.25 | 0.35 | 0.36 | 0.40 | 0.55 | 0.79 | 1.35 | 1.84 |
| 0.21 | 0.31 | 0.36 | 0.41 | 0.55 | 0.77 | 1.10 | 1.79 |
| 0.20 | 0.30 | 0.36 | 0.42 | 0.53 | 0.71 | 1.11 | 1.56 |
| 0.19 | 0.30 | 0.34 | 0.38 | 0.48 | 0.67 | 1.03 | 1.60 |
| 0.18 | 0.28 | 0.28 | 0.36 | 0.41 | 0.66 | 0.92 | 1.35 |
| 0.14 | 0.24 | 0.28 | 0.33 | 0.40 | 0.58 | 0.86 | 1.27 |
| 0.16 | 0.19 | 0.23 | 0.26 | 0.36 | 0.49 | 0.83 | 1.11 |
| k = 2 |  |  |  |  |  |  |  |
| 0.19 | 0.29 | 0.34 | 0.39 | 0.54 | 0.78 | 1.15 | 1.71 |
| 0.21 | 0.31 | 0.33 | 0.39 | 0.49 | 0.76 | 1.11 | 1.70 |
| 0.15 | 0.29 | 0.34 | 0.36 | 0.46 | 0.69 | 1.16 | 1.53 |
| 0.16 | 0.23 | 0.30 | 0.34 | 0.45 | 0.62 | 0.93 | 1.28 |
| 0.19 | 0.25 | 0.29 | 0.33 | 0.42 | 0.63 | 0.88 | 1.18 |
| 0.17 | 0.26 | 0.28 | 0.32 | 0.41 | 0.60 | 0.80 | 1.17 |
| 0.19 | 0.23 | 0.28 | 0.33 | 0.40 | 0.22 | 0.78 | 1.06 |
| 0.11 | 0.22 | 0.25 | 0.33 | 0.35 | 0.56 | 0.76 | 0.94 |
| k = 3 |  |  |  |  |  |  |  |
| 0.19 | 0.24 | 0.27 | 0.34 | 0.42 | 0.66 | 0.96 | 1.24 |
| 0.19 | 0.29 | 0.30 | 0.35 | 0.44 | 0.64 | 0.92 | 1.38 |
| 0.19 | 0.24 | 0.30 | 0.34 | 0.48 | 0.64 | 0.92 | 1.34 |
| 0.15 | 0.21 | 0.28 | 0.30 | 0.40 | 0.54 | 0.78 | 1.07 |
| 0.17 | 0.25 | 0.30 | 0.29 | 0.42 | 0.55 | 0.79 | 1.09 |
| 0.15 | 0.28 | 0.27 | 0.33 | 0.37 | 0.56 | 0.72 | 1.01 |
| 0.15 | 0.22 | 0.27 | 0.28 | 0.35 | 0.50 | 0.71 | 0.95 |
| 0.15 | 0.19 | 0.20 | 0.25 | 0.32 | 0.45 | 0.60 | 0.82 |

TABLE 6

|  |  |  |  |  |  |  |  |
|---|---|---|---|---|---|---|---|
| k = 4 |  |  |  |  |  |  |  |
| 0.22 | 0.29 | 0.30 | 0.34 | 0.44 | 0.66 | 1.08 | 1.46 |
| 0.30 | 0.37 | 0.40 | 0.45 | 0.56 | 0.80 | 1.12 | 1.48 |
| 0.26 | 0.31 | 0.36 | 0.34 | 0.48 | 0.72 | 1.10 | 1.21 |
| 0.19 | 0.25 | 0.30 | 0.28 | 0.40 | 0.56 | 0.88 | 1.45 |
| 0.20 | 0.27 | 0.28 | 0.35 | 0.37 | 0.58 | 0.88 | 1.15 |

TABLE 6-continued

|  |  |  |  |  |  |  |  |
|---|---|---|---|---|---|---|---|
| 0.17 | 0.24 | 0.26 | 0.31 | 0.40 | 0.49 | 0.87 | 1.19 |
| 0.16 | 0.24 | 0.30 | 0.35 | 0.38 | 0.56 | 0.77 | 1.07 |
| 0.15 | 0.22 | 0.23 | 0.28 | 0.30 | 0.48 | 0.62 | 0.96 |
| k = 5 |  |  |  |  |  |  |  |
| 0.28 | 0.38 | 0.43 | 0.47 | 0.60 | 0.81 | 1.32 | 1.69 |
| 0.30 | 0.38 | 0.41 | 0.44 | 0.55 | 0.81 | 1.26 | 1.74 |
| 0.29 | 0.43 | 0.39 | 0.46 | 0.58 | 0.86 | 1.08 | 1.63 |
| 0.22 | 0.31 | 0.34 | 0.39 | 0.43 | 0.61 | 1.02 | 1.40 |
| 0.22 | 0.31 | 0.32 | 0.40 | 0.43 | 0.61 | 0.99 | 1.57 |
| 0.22 | 0.35 | 0.38 | 0.41 | 0.52 | 0.77 | 1.07 | 1.49 |
| 0.22 | 0.30 | 0.30 | 0.35 | 0.45 | 0.57 | 0.91 | 1.19 |
| 0.16 | 0.23 | 0.26 | 0.28 | 0.40 | 0.57 | 0.82 | 1.07 |
| k = 6 |  |  |  |  |  |  |  |
| 0.26 | 0.33 | 0.41 | 0.43 | 0.58 | 0.72 | 1.19 | 1.56 |
| 0.28 | 0.40 | 0.43 | 0.54 | 0.60 | 0.95 | 1.29 | 1.66 |
| 0.28 | 0.39 | 0.40 | 0.47 | 0.59 | 0.81 | 1.24 | 1.77 |
| 0.26 | 0.34 | 0.38 | 0.41 | 0.59 | 0.81 | 1.03 | 1.56 |
| 0.28 | 0.34 | 0.38 | 0.44 | 0.60 | 0.72 | 1.06 | 1.50 |
| 0.26 | 0.36 | 0.34 | 0.45 | 0.53 | 0.69 | 1.02 | 1.50 |
| 0.19 | 0.30 | 0.33 | 0.41 | 0.47 | 0.68 | 0.86 | 1.31 |
| 0.22 | 0.28 | 0.33 | 0.35 | 0.43 | 0.61 | 0.84 | 1.22 |
| k = 7 |  |  |  |  |  |  |  |
| 0.30 | 0.44 | 0.48 | 0.58 | 0.76 | 1.02 | 1.31 | 1.77 |
| 0.25 | 0.39 | 0.37 | 0.47 | 0.62 | 0.90 | 1.35 | 1.59 |
| 0.28 | 0.42 | 0.40 | 0.53 | 0.63 | 0.95 | 1.26 | 1.55 |
| 0.25 | 0.34 | 0.37 | 0.43 | 0.49 | 0.83 | 1.15 | 1.58 |
| 0.29 | 0.36 | 0.46 | 0.43 | 0.63 | 0.78 | 1.19 | 1.36 |
| 0.21 | 0.32 | 0.34 | 0.38 | 0.47 | 0.65 | 1.05 | 1.31 |
| 0.24 | 0.32 | 0.36 | 0.41 | 0.51 | 0.71 | 1.05 | 1.22 |
| 0.19 | 0.29 | 0.33 | 0.37 | 0.42 | 0.65 | 0.98 | 1.31 |

TABLE 7

|  |  |  |  |  |  |  |  |
|---|---|---|---|---|---|---|---|
| k = 0 |  |  |  |  |  |  |  |
| 3.43 | 2.73 | 2.16 | 1.63 | 1.16 | 0.81 | 0.69 | 0.58 |
| 3.94 | 2.88 | 2.38 | 1.74 | 1.23 | 0.96 | 0.71 | 0.60 |
| 4.23 | 3.15 | 2.68 | 1.66 | 1.31 | 0.95 | 0.80 | 0.59 |
| 5.07 | 3.63 | 3.02 | 2.11 | 1.42 | 1.02 | 0.84 | 0.67 |
| 5.83 | 4.31 | 3.49 | 2.41 | 1.72 | 1.21 | 0.89 | 0.73 |
| 6.57 | 5.12 | 4.12 | 2.84 | 1.92 | 1.40 | 1.16 | 0.84 |
| 7.83 | 6.78 | 4.79 | 3.40 | 2.16 | 1.59 | 1.18 | 1.08 |
| 9.13 | 7.00 | 5.71 | 3.81 | 2.71 | 1.98 | 1.50 | 1.11 |
| k = 1 |  |  |  |  |  |  |  |
| 3.04 | 2.51 | 2.12 | 1.54 | 1.11 | 0.88 | 0.69 | 0.57 |
| 3.50 | 2.86 | 2.38 | 1.73 | 1.34 | 0.97 | 0.82 | 0.64 |
| 3.79 | 3.26 | 2.55 | 1.85 | 1.27 | 1.05 | 0.89 | 0.67 |
| 4.07 | 3.31 | 2.62 | 1.97 | 1.56 | 1.15 | 0.88 | 0.69 |
| 4.67 | 3.84 | 2.74 | 2.26 | 1.66 | 1.33 | 1.07 | 0.87 |
| 5.47 | 4.41 | 3.54 | 2.56 | 1.84 | 1.52 | 1.18 | 1.06 |
| 6.22 | 4.73 | 3.93 | 2.94 | 2.17 | 1.68 | 1.39 | 1.07 |
| 5.73 | 5.45 | 4.31 | 3.54 | 2.53 | 1.96 | 1.50 | 1.30 |
| k = 2 |  |  |  |  |  |  |  |
| 2.51 | 2.12 | 1.69 | 1.38 | 1.10 | 0.96 | 0.67 | 0.52 |
| 2.93 | 2.25 | 1.83 | 1.46 | 1.20 | 1.07 | 0.71 | 0.58 |
| 2.99 | 2.41 | 1.95 | 1.73 | 1.29 | 1.01 | 0.80 | 0.66 |
| 3.34 | 2.59 | 2.27 | 1.69 | 1.28 | 1.06 | 0.91 | 0.66 |
| 3.39 | 2.68 | 2.44 | 1.77 | 1.49 | 1.22 | 1.00 | 0.77 |
| 4.33 | 3.03 | 2.71 | 2.12 | 1.68 | 1.35 | 1.08 | 0.89 |
| 4.86 | 3.44 | 3.00 | 2.55 | 1.99 | 1.58 | 1.20 | 0.96 |
| 4.34 | 3.47 | 3.75 | 2.83 | 2.32 | 1.74 | 1.35 | 1.13 |
| k = 3 |  |  |  |  |  |  |  |
| 2.48 | 1.85 | 1.61 | 1.24 | 0.98 | 0.88 | 0.67 | 0.55 |
| 2.78 | 1.89 | 1.65 | 1.41 | 1.01 | 0.95 | 0.64 | 0.54 |
| 2.64 | 2.04 | 1.93 | 1.40 | 1.28 | 0.94 | 0.76 | 0.60 |
| 2.96 | 2.11 | 1.83 | 1.55 | 1.41 | 1.11 | 0.87 | 0.61 |
| 3.08 | 2.26 | 2.02 | 1.92 | 1.62 | 1.17 | 0.98 | 0.81 |
| 3.32 | 2.80 | 1.98 | 2.11 | 1.67 | 1.54 | 1.06 | 0.72 |
| 3.46 | 2.65 | 2.63 | 2.48 | 2.10 | 1.53 | 1.29 | 0.88 |
| 2.76 | 2.68 | 2.76 | 2.86 | 2.60 | 1.85 | 1.51 | 1.09 |

TABLE 8

|  |  |  |  |  |  |  |  |
|---|---|---|---|---|---|---|---|
| k = 4 |  |  |  |  |  |  |  |
| 3.00 | 2.51 | 2.28 | 1.62 | 1.57 | 1.25 | 0.85 | 0.62 |
| 3.43 | 2.39 | 2.08 | 1.50 | 1.61 | 1.06 | 0.90 | 0.62 |
| 3.48 | 2.90 | 2.22 | 2.03 | 1.79 | 1.33 | 1.02 | 0.57 |

TABLE 8-continued

| | | | | | | | |
|---|---|---|---|---|---|---|---|
| 3.48 | 2.65 | 2.67 | 2.14 | 1.80 | 1.67 | 1.01 | 0.80 |
| 3.26 | 2.65 | 2.28 | 2.60 | 2.12 | 1.98 | 1.35 | 0.88 |
| 2.76 | 2.56 | 2.83 | 2.66 | 2.56 | 1.66 | 1.49 | 1.03 |
| 2.54 | 2.71 | 3.12 | 2.76 | 2.76 | 2.52 | 1.78 | 0.97 |
| 2.28 | 2.35 | 2.86 | 3.04 | 2.81 | 2.84 | 1.91 | 1.28 |
| k = 5 | | | | | | | |
| 2.52 | 1.88 | 1.70 | 1.41 | 1.11 | 0.89 | 0.72 | 0.56 |
| 2.79 | 1.86 | 1.61 | 1.37 | 1.17 | 0.96 | 0.70 | 0.61 |
| 2.42 | 1.95 | 1.77 | 1.33 | 1.29 | 0.98 | 0.84 | 0.65 |
| 2.45 | 1.90 | 1.73 | 1.59 | 1.28 | 1.04 | 0.94 | 0.73 |
| 2.53 | 1.88 | 1.85 | 1.66 | 1.50 | 1.20 | 1.09 | 0.87 |
| 2.60 | 2.08 | 1.68 | 1.82 | 1.45 | 1.44 | 1.17 | 0.92 |
| 2.75 | 1.90 | 1.87 | 1.73 | 1.69 | 1.68 | 1.34 | 1.18 |
| 2.21 | 1.85 | 1.67 | 1.92 | 1.86 | 1.87 | 1.65 | 1.22 |
| k = 6 | | | | | | | |
| 2.76 | 2.23 | 1.97 | 1.53 | 1.12 | 0.89 | 0.65 | 0.54 |
| 2.90 | 2.32 | 1.96 | 1.49 | 1.10 | 0.94 | 0.74 | 0.58 |
| 2.85 | 2.26 | 1.95 | 1.53 | 1.19 | 0.93 | 0.75 | 0.71 |
| 3.03 | 2.40 | 1.84 | 1.58 | 1.15 | 1.08 | 0.90 | 0.71 |
| 2.84 | 2.27 | 2.00 | 1.70 | 1.27 | 1.13 | 0.99 | 0.96 |
| 3.10 | 2.43 | 1.91 | 1.60 | 1.35 | 1.18 | 1.11 | 0.99 |
| 3.16 | 2.53 | 1.92 | 1.61 | 1.45 | 1.28 | 1.31 | 0.99 |
| 2.68 | 2.21 | 1.99 | 1.61 | 1.56 | 1.49 | 1.39 | 1.32 |
| k = 7 | | | | | | | |
| 3.79 | 2.43 | 2.03 | 1.44 | 1.01 | 0.83 | 0.65 | 0.56 |
| 4.24 | 2.63 | 2.07 | 1.53 | 1.16 | 0.87 | 0.81 | 0.64 |
| 3.55 | 2.58 | 2.04 | 1.43 | 1.13 | 0.88 | 0.78 | 0.59 |
| 3.36 | 2.41 | 1.97 | 1.42 | 1.19 | 0.88 | 0.81 | 0.71 |
| 4.02 | 2.88 | 2.24 | 1.58 | 1.27 | 0.96 | 0.94 | 0.77 |
| 5.30 | 3.14 | 2.43 | 1.58 | 1.28 | 1.07 | 0.93 | 0.95 |
| 5.86 | 3.06 | 2.46 | 1.70 | 1.40 | 1.09 | 1.15 | 1.04 |
| 4.91 | 3.04 | 2.37 | 1.74 | 1.41 | 1.34 | 1.22 | 1.33 |

TABLE 9

| | | | | | | | |
|---|---|---|---|---|---|---|---|
| k = 0 | | | | | | | |
| 0.06 | 0.10 | 0.16 | 0.20 | 0.20 | 0.28 | 0.42 | 0.42 |
| 0.10 | 0.16 | 0.13 | 0.21 | 0.22 | 0.33 | 0.45 | 0.51 |
| 0.09 | 0.16 | 0.13 | 0.17 | 0.23 | 0.34 | 0.44 | 0.50 |
| 0.06 | 0.12 | 0.13 | 0.20 | 0.20 | 0.30 | 0.48 | 0.60 |
| 0.13 | 0.15 | 0.15 | 0.22 | 0.27 | 0.34 | 0.53 | 0.58 |
| 0.09 | 0.16 | 0.17 | 0.17 | 0.23 | 0.37 | 0.60 | 0.73 |
| 0.08 | 0.19 | 0.22 | 0.25 | 0.30 | 0.44 | 0.62 | 0.75 |
| 0.12 | 0.16 | 0.20 | 0.26 | 0.31 | 0.51 | 0.69 | 0.87 |
| k = 1 | | | | | | | |
| 0.07 | 0.13 | 0.15 | 0.19 | 0.25 | 0.28 | 0.42 | 0.50 |
| 0.08 | 0.11 | 0.19 | 0.18 | 0.27 | 0.32 | 0.42 | 0.49 |
| 0.11 | 0.15 | 0.15 | 0.18 | 0.24 | 0.33 | 0.45 | 0.53 |
| 0.09 | 0.12 | 0.15 | 0.18 | 0.25 | 0.37 | 0.44 | 0.55 |
| 0.08 | 0.16 | 0.16 | 0.17 | 0.26 | 0.34 | 0.51 | 0.71 |
| 0.07 | 0.15 | 0.17 | 0.21 | 0.27 | 0.42 | 0.54 | 0.71 |
| 0.11 | 0.17 | 0.19 | 0.25 | 0.33 | 0.45 | 0.65 | 0.87 |
| 0.12 | 0.18 | 0.23 | 0.28 | 0.35 | 0.50 | 0.71 | 0.95 |
| k = 2 | | | | | | | |
| 0.12 | 0.13 | 0.17 | 0.15 | 0.24 | 0.28 | 0.35 | 0.49 |
| 0.10 | 0.12 | 0.19 | 0.18 | 0.22 | 0.33 | 0.40 | 0.50 |
| 0.08 | 0.15 | 0.18 | 0.21 | 0.21 | 0.32 | 0.40 | 0.51 |
| 0.14 | 0.16 | 0.17 | 0.17 | 0.24 | 0.31 | 0.46 | 0.54 |
| 0.13 | 0.16 | 0.19 | 0.21 | 0.25 | 0.36 | 0.50 | 0.63 |
| 0.13 | 0.15 | 0.21 | 0.22 | 0.28 | 0.39 | 0.53 | 0.68 |
| 0.12 | 0.19 | 0.23 | 0.25 | 0.30 | 0.44 | 0.62 | 0.79 |
| 0.13 | 0.21 | 0.23 | 0.29 | 0.32 | 0.51 | 0.66 | 0.94 |
| k = 3 | | | | | | | |
| 0.11 | 0.12 | 0.15 | 0.19 | 0.21 | 0.26 | 0.34 | 0.42 |
| 0.12 | 0.13 | 0.13 | 0.16 | 0.20 | 0.27 | 0.39 | 0.39 |
| 0.09 | 0.15 | 0.17 | 0.19 | 0.18 | 0.29 | 0.39 | 0.44 |
| 0.10 | 0.12 | 0.16 | 0.17 | 0.21 | 0.30 | 0.38 | 0.54 |
| 0.11 | 0.13 | 0.17 | 0.17 | 0.21 | 0.32 | 0.40 | 0.54 |
| 0.07 | 0.13 | 0.17 | 0.21 | 0.27 | 0.36 | 0.47 | 0.61 |
| 0.12 | 0.20 | 0.20 | 0.19 | 0.29 | 0.31 | 0.51 | 0.63 |
| 0.12 | 0.18 | 0.18 | 0.24 | 0.28 | 0.42 | 0.55 | 0.76 |

TABLE 10

| | | | | | | | |
|---|---|---|---|---|---|---|---|
| k = 4 | | | | | | | |
| 0.04 | 0.06 | 0.10 | 0.13 | 0.15 | 0.21 | 0.28 | 0.37 |

TABLE 10-continued

| | | | | | | | |
|---|---|---|---|---|---|---|---|
| 0.04 | 0.06 | 0.12 | 0.17 | 0.13 | 0.23 | 0.29 | 0.42 |
| 0.04 | 0.10 | 0.11 | 0.10 | 0.15 | 0.21 | 0.30 | 0.41 |
| 0.00 | 0.09 | 0.10 | 0.16 | 0.14 | 0.20 | 0.37 | 0.44 |
| 0.10 | 0.12 | 0.12 | 0.15 | 0.18 | 0.29 | 0.44 | 0.50 |
| 0.08 | 0.15 | 0.17 | 0.20 | 0.19 | 0.31 | 0.44 | 0.54 |
| 0.12 | 0.17 | 0.19 | 0.19 | 0.22 | 0.33 | 0.48 | 0.66 |
| 0.15 | 0.18 | 0.20 | 0.26 | 0.31 | 0.40 | 0.56 | 0.72 |
| k = 5 | | | | | | | |
| 0.10 | 0.15 | 0.15 | 0.19 | 0.21 | 0.28 | 0.36 | 0.41 |
| 0.11 | 0.14 | 0.17 | 0.17 | 0.21 | 0.28 | 0.37 | 0.48 |
| 0.13 | 0.12 | 0.15 | 0.17 | 0.22 | 0.32 | 0.36 | 0.50 |
| 0.08 | 0.16 | 0.17 | 0.20 | 0.21 | 0.31 | 0.41 | 0.58 |
| 0.10 | 0.17 | 0.20 | 0.21 | 0.26 | 0.34 | 0.47 | 0.66 |
| 0.16 | 0.15 | 0.19 | 0.23 | 0.28 | 0.35 | 0.54 | 0.75 |
| 0.16 | 0.19 | 0.21 | 0.23 | 0.30 | 0.38 | 0.59 | 0.72 |
| 0.17 | 0.21 | 0.24 | 0.27 | 0.33 | 0.45 | 0.70 | 0.91 |
| k = 6 | | | | | | | |
| 0.12 | 0.17 | 0.18 | 0.19 | 0.21 | 0.31 | 0.42 | 0.47 |
| 0.11 | 0.11 | 0.16 | 0.21 | 0.24 | 0.32 | 0.44 | 0.55 |
| 0.10 | 0.12 | 0.17 | 0.21 | 0.22 | 0.33 | 0.45 | 0.51 |
| 0.10 | 0.14 | 0.18 | 0.19 | 0.26 | 0.39 | 0.48 | 0.57 |
| 0.09 | 0.15 | 0.19 | 0.22 | 0.26 | 0.39 | 0.50 | 0.68 |
| 0.17 | 0.21 | 0.22 | 0.26 | 0.34 | 0.38 | 0.62 | 0.79 |
| 0.17 | 0.25 | 0.23 | 0.31 | 0.36 | 0.49 | 0.67 | 0.93 |
| 0.17 | 0.21 | 0.26 | 0.31 | 0.37 | 0.58 | 0.79 | 1.07 |
| k = 7 | | | | | | | |
| 0.09 | 0.14 | 0.14 | 0.16 | 0.24 | 0.30 | 0.43 | 0.47 |
| 0.09 | 0.17 | 0.15 | 0.18 | 0.23 | 0.35 | 0.47 | 0.52 |
| 0.10 | 0.12 | 0.17 | 0.20 | 0.23 | 0.34 | 0.48 | 0.56 |
| 0.12 | 0.12 | 0.19 | 0.22 | 0.28 | 0.38 | 0.54 | 0.60 |
| 0.15 | 0.20 | 0.19 | 0.24 | 0.31 | 0.40 | 0.53 | 0.74 |
| 0.13 | 0.19 | 0.23 | 0.28 | 0.35 | 0.49 | 0.62 | 0.77 |
| 0.15 | 0.19 | 0.23 | 0.28 | 0.36 | 0.50 | 0.70 | 0.90 |
| 0.15 | 0.26 | 0.27 | 0.31 | 0.41 | 0.63 | 0.74 | 1.02 |

What is claimed is:

1. An encoding apparatus for encoding a digital image signal, comprising:

band dividing means for dividing the digital image signal into a plurality of bands;

block structuring means for structuring each of the plurality of bands of the band-divided image signal into a plurality of blocks each having a plurality of pixels;

orthogonal transformation means performing an orthogonal transform on each of the plurality of blocks to obtain transform coefficients;

discriminating means for discriminating each of the plurality of blocks as a moving image block or a static image block;

weighting means for weighting the obtained transform coefficients according to the discrimination performed by said discriminating means; and encoding means for quantizing the weighted transform coefficients in accordance with a quantization level suitable for each of the plurality of bands and for encoding the quantized and weighted transform coefficients for each of the plurality of blocks, such that said encoding is performed independently for each of the plurality of bands;

wherein each of said plurality of blocks includes a plurality of values arranged in a vertical frequency direction and a horizontal frequency directions;

wherein both the vertical frequency direction and the horizontal frequency direction are divided into lower and higher frequency sub-bands to produce LL, HL, LH, and HH sub-bands; and wherein for the LL sub-band, weights assigned by said weighting means increase in the vertical frequency direction, the horizontal frequency direction, and in a diagonal frequency direction, from low horizontal frequencies and low vertical frequencies to high horizontal frequencies and high vertical frequencies.

2. The encoding apparatus of claim 1, wherein said orthogonal transform is a discrete cosine transform (DCT).

3. The encoding apparatus of claim 1, wherein said band dividing means divides the digital image signal into the plurality of bands, according to frequency.

4. The encoding apparatus of claim 1, wherein said weighting means weights the obtained transform coefficients to provide continuity between adjacent band-divided blocks.

5. An encoding apparatus for encoding a digital image signal, comprising:

sub-band dividing means for dividing the digital image signal into a plurality of sub-bands according to frequency and for dividing each of the plurality of sub-bands into a plurality of blocks;

orthogonal transformation means for receiving the plurality of blocks for each of the plurality of sub-bands and for producing a transform coefficient for each of the plurality of blocks;

discrimination means for discriminating each of the plurality of blocks as a moving image block or a static image block based on the transform coefficient for each of the plurality of blocks, to produce a discrimination result for each of the plurality of blocks;

weighting means for receiving the transform coefficient for each of the plurality of blocks and the discrimination result for each of the plurality of blocks and for assigning a weight, suitable for each of the plurality of sub-bands, to the transform coefficient for each of the plurality of blocks, to produce a weighted transform coefficient for each of the plurality of blocks;

encoding means for encoding the weighted transform coefficient for each of the plurality of blocks, such that said encoding is suitable for each of the plurality of sub-bands wherein each of said plurality of blocks includes a plurality of values arranged in a vertical frequency direction and a horizontal frequency direction;

wherein both the vertical frequency direction and the horizontal frequency direction are divided into lower and higher frequency sub-bands to produce LL, HL, LH, and HH sub-bands; and wherein for the LL sub-band, weights assigned by said weighting means increase in the vertical frequency direction, the horizontal frequency direction, and in a diagonal frequency direction, from low horizontal frequencies and low vertical frequencies to high horizontal frequencies and high vertical frequencies.

6. The encoding apparatus of claim 5, where the digital image signal is a NTSC-compatible color television signal.

7. The encoding apparatus of claim 5, wherein the plurality of blocks are three-dimensional blocks.

8. The encoding apparatus of claim 5, said weighting means further including quantizing means for quantizing the weighted transform coefficient for each of the plurality of blocks such that said quantizing is suitable for each of the plurality of sub-bands.

9. The encoding apparatus of claim 5, said sub-band dividing means further converting the digital image signal into a luminance signal and color difference signals.

10. The encoding apparatus of claim 5, wherein only the LL sub-band is encoded by said encoding means for color difference signals of a moving image.

11. The encoding apparatus of claim 5, wherein for the HL sub-band, weights assigned by said weighting means increase in the vertical frequency direction, decrease in the horizontal frequency direction, and increase in a diagonal frequency direction, from high horizontal frequencies and low vertical frequencies to low horizontal frequencies and high vertical frequencies.

12. The encoding apparatus of claim 11, wherein for the LH sub-band, weights assigned by said weighting means increase in the horizontal frequency direction, decrease in the vertical frequency direction, and increase in a diagonal frequency direction, from low horizontal frequencies and high vertical frequencies to high horizontal frequencies and low vertical frequencies.

13. The encoding apparatus of claim 12, wherein only the LL sub-band, HL sub-band, and LH sub-band, are encoded by said encoding means for luminance signals of a moving image.

14. The encoding apparatus of claim 12, wherein for the HH sub-band, weights assigned by said weighting means decrease in the horizontal frequency direction, decrease in the vertical frequency direction, and increase in a diagonal frequency direction, from high horizontal frequencies and high vertical frequencies to low horizontal frequencies and low vertical frequencies.

15. The encoding apparatus of claim 14, wherein all of the LL sub-bands, HL sub-band, LH sub-band, and HH sub-band are encoded by said encoding means for both luminance signals and color difference signals of a static image.

* * * * *